US008374450B2

(12) United States Patent
Averbuch et al.

(10) Patent No.: US 8,374,450 B2
(45) Date of Patent: Feb. 12, 2013

(54) METHOD FOR DATA COMPRESSION USING LOCAL COSINE TRANSFORM

(76) Inventors: Amir Averbuch, Jaffa (IL); Valery Zheludev, Tel Aviv Yaffo (IL); Moshe Guttmman, Tel Aviv Yaffo (IL)

( * ) Notice: Subject to any disclaimer, the term of this patent is extended or adjusted under 35 U.S.C. 154(b) by 933 days.

(21) Appl. No.: 12/471,431

(22) Filed: May 25, 2009

(65) Prior Publication Data
US 2010/0232723 A1    Sep. 16, 2010

Related U.S. Application Data

(60) Provisional application No. 61/160,293, filed on Mar. 14, 2009.

(51) Int. Cl.
*G06K 9/36* (2006.01)
*G06K 9/46* (2006.01)
(52) U.S. Cl. ........................ 382/250; 382/248
(58) Field of Classification Search .............. 382/232, 382/248, 250; 348/403.1
See application file for complete search history.

(56) References Cited

U.S. PATENT DOCUMENTS

| 6,104,982 A * | 8/2000 | Vermeer .................. 702/14 |
| 6,160,919 A * | 12/2000 | Hale ........................ 382/250 |
| 6,594,394 B1 * | 7/2003 | Stromberg et al. .......... 382/232 |
| 6,799,141 B1 * | 9/2004 | Stoustrup et al. ............. 702/159 |
| 2008/0260276 A1 * | 10/2008 | Yamatani et al. ............. 382/249 |

OTHER PUBLICATIONS

Wu et al. ("Comparison of propagator decomposition in seismic imaging by wavelets, wavelet packets, and local harmonics," SPIE vol. 3453, Jul. 1988, pp. 163-179).*
Zhang et al. ("High-dimensional data compression via PHLCT," SPIE vol. 6701, 2007).*
Aharoni et al. ("Local Cosine Transform—a Method for the Reduction of the Blocking Effect in JPEG," SPIE vol. 2034, 1993, pp. 205-217).*

* cited by examiner

*Primary Examiner* — Yubin Hung
(74) *Attorney, Agent, or Firm* — Nathan & Associates Patent Agents Ltd.; Menachem Nathan

(57) ABSTRACT

Methods for compression of two-dimensional data arrays which are piece-wise smooth in one direction and have oscillating events in the other direction. In one embodiment, a wavelet transform is applied in the piece-wise smooth direction and a local cosine transform (LCT) is applied in the direction with oscillatory events, both producing respective transform coefficients. The LCT coefficients are reordered to mimic a wavelet transform coefficient order, and both wavelet transform and reordered LCT coefficients are quantized and entropy coded to obtain a compressed 2D image. In some embodiments with oscillatory events in both directions, a LCT is applied in both directions and all the LCT coefficients in each direction are reordered before the quantization and entropy coding.

17 Claims, 24 Drawing Sheets

(a)

(b)

(a)

(b)

(a)

(b)

(a)

(b)

(a)

(b)

(a)

(b)

(a)

(b)

METHOD FOR DATA COMPRESSION USING LOCAL COSINE TRANSFORM

CROSS REFERENCE TO RELATED APPLICATIONS

This application claims the benefit of U.S. Provisional patent application 61/160,293 filed Mar. 14, 2009, which is incorporated herein by reference in its entirety.

FIELD OF THE INVENTION

The invention relates in general to methods and systems for compression of imagery data and in particular to methods and systems for online and offline compression of seismic data, hyper-spectral (HS) images, fingerprints and multimedia images.

BACKGROUND OF THE INVENTION

Imagery data is widespread and includes for example 3D seismic data, HS image, fingerprints and multimedia images. In particular, 3D seismic data and HS images are considered to be very large datasets. Efficient algorithms are needed to compress such datasets in order to store or transmit the data via different networks (wireless, Internet, TCP/IP, etc), or from various moving entities (e.g. planes, satellites, boats or cars) to other entities such as base stations. The compression ratio between the size of an original input image and a compressed image should be as high as possible without damaging the interpretation procedures applied after decompression. The compression of seismic, HS datasets and fingerprints should preserve fine details which are critical for interpretations after decompression. Interpretation is less critical for multimedia type images, where compression/decompression should however preserve acceptable visual quality. Multimedia images usually do not go through interpretation analysis after decompression.

A typical known data compression scheme is shown in FIG. 1a. This scheme operates on a 2D imagery data input. 2D data sets may be defined by two, first and second orthogonal axes or "directions". Commonly, these axes are referred to as "horizontal" and "vertical". The scheme includes two phases: 1) application of a transform to the horizontal direction of the image, step 100a, followed by the application of a transform to the vertical direction of the image, step 110a, both steps being part of a lossless phase. In general, the same transform (e.g. a wavelet transform) is applied to both directions; 2) processing of horizontal and vertical wavelet transform coefficients to obtain a 2D compressed image, step 120a. FIG. 1b gives more details of processing step 120a. Step 120a includes two phases: 1) quantization of the transform coefficients in a lossy phase step 130b; and 2) application of entropy coding for packing the quantized coefficients into a compressed form in a lossless phase step 140b. The output of step 140b is a 2D compressed image. Decompression is done in a reverse order.

Wavelet transforms have a successful record in achieving high compression ratios for still images while achieving high quality. For example, the transform used to perform steps 100a and 110a in FIG. 1a above is typically the 2D wavelet transform of the JPEG2000 standard which replaces the regular JPEG. The wavelet transform is the transform of choice in many compression algorithms. For example, the wavelet transform was chosen to handle seismic compression, see e.g. P. L. Donoho, R. A. Ergas, and J. D. Villasenor, "High-performance seismic trace compression", in 65th Ann. Internat. Mtg. Soc. Expl. Geophys., Expanded Abstracts, (1995), 160-163; M. F. Khene and S. H. Abdul-Jauwad, "Efficient seismic compression using the lifting scheme", in 70th Ann. Internat. Mtg., Soc. Expl. Geophys., Expanded Abstracts, (2000), 2052-2054; and A. Vassiliou and M. V. Wickerhauser, "Comparison of wavelet image coding schemes for seismic data compression", in 67th Ann. Internat. Mtg., Soc. Expl. Geophys., Expanded Abstracts, (1997), 1334-1337.

The coding schemes of wavelet transforms described in J. M. Shapiro, "Embedded image coding using zerotree of wavelet coefficients", IEEE Trans. Sign. Proc., vol. 41, pp. 3445-3462, 1993 (hereinafter "EZW") and A. Said and W. W. Pearlman, "A new, fast and efficient image codec based on set partitioning in hierarchical trees" IEEE Trans. on Circ. and Syst. for Video Tech., vol. 6, pp. 243-250, 1996 (hereinafter "SPIHT"), are used in well known 2D wavelet transform schemes for still image compression. The wavelet transform in used in both directions. Both EZW and SPIHT utilize the correlation among the multiscale (also called multiresolution) decomposition of an image to achieve high compression ratios. The SPIHT scheme is associated with wavelet transforms that rely on the space-frequency localization of the wavelets and the tree structure of the coefficient arrays in its multiscale representation.

Wavelet transforms are also used to compress HS data cubes. A HS data cube can be captured by a special HS camera. The HS camera captures the same image (also called "spatial image") in many wavebands. The number of wavebands depends on the camera resolution and can vary from a few wavebands ("multi-spectral imaging") to a few thousands of wavebands ("HS imaging"). A HS image can be viewed as a 3D image cube where the X-Y plane is the spatial description of the image and the Z direction are the wavebands. In waveband scanning, which captures the HS spectra from the X-Z plane, a HS camera collects each time unit a line of all the wavebands (the Z direction). Each spatial pixel is represented by a vector (also called hereinafter multipixel) of the intensities in all the available wavebands. 2D compression of planes (wavebands×multipixels) is preferable since then no buffering is needed, because compression is done according to the data capturing mechanism. Compression of HS cubes should retain the spectral characteristic features of the multipixels. A number of HS compression algorithms were suggested such as G. Motta, F. Rizzo, and J. A. Storer (editors), "Hyperspectral data compression", Kluwer Academic Publishers, 2006, 273-308. Many of them extend wavelet-based compression methods to compress 3D HS data cubes such as Y. H Tseng, H. K. Shih, and P. H. Hsu, "Hyperspectral Image Compression Using Three-dimensional Wavelet Transformation", Proceedings of the 21th Asia Conference on Remote Sensing, 2000, pp. 809-814, X. Tang and W. A. Pearlman, "Three-dimensional wavelet-based compression of hyperspectral images", in "Hyperspectral data compression", Eds. G. Motta, F. Rizzo, and J. A. Storer, Kluwer Acad. Publ., 2006, 273-308, J. E. Fowler, J. T. Rucker, "Three-Dimensional Wavelet-Based Compression of Hyperspectral Imagery", in "Hyperspectral Data Exploitation", Ed. Chein-I Chang, John Wiley & Sons, (2007), 379-407.

Due to the great variability of seismic, HS and fingerprints images, which have inherently noisy backgrounds, oscillatory nature and many fine details that have to be preserved, wavelet based methods do not produce high compression ratios, see e.g. A. Z. Averbuch, F. Meyer, J-O. Stromberg, R. Coifman and A. Vassiliou, "Efficient Compression for Seismic Data", IEEE Trans. on Image Processing, vol. 10, no. 12, pp. 1801-1814, 2001 (hereinafter "AMSCV") and F. G. Meyer, "Fast compression of seismic data with local trigonometric bases", Proc. SPIE 3813, Wavelet Applications in Signal and Image Processing VII, A. Aldroubi, A. F. Laine, and M. A. Unser, Eds., 1999, pp. 648-658 (hereinafter "FM"). Both AMSCV and FM showed that wavelet transforms do not fit seismic compression because of the oscillatory patterns present in seismic data, and that wavelet transforms do not capture efficiently these patterns. During a compression process, these patterns necessitate many bits to preserve features which are critical for their interpretation, thus no high compression ratios are achieved.

Seismic data has different structure in its two directions. While in one direction (say the horizontal one) the structure is piece-wise smooth and thus suits the capability of a wavelet transform to make sparse piece-wise smooth data, the traces in the other (vertical) direction include oscillatory patterns. While wavelets provide a sparse representation in the horizontal direction, helping to achieve a high compression ratio of the seismic data, they fail to properly (properly means here fewer coefficients) represent the vertical oscillations. The same is true for HS data cubes and fingerprint images.

On the other hand, the local cosine transform or "LCT" (R. R. Coifman and Y. Meyer, "Remarques sur l'analyse de Fourier a fenetre", C. R. Acad. Sci., pp. 259-261, 1991 (hereinafter "CMLCT") catches well oscillatory patterns. 2D LCT (in both horizontal and vertical directions) has been applied for seismic compression, see e.g. AMSCV, FM, Y. Wang and R.-S. Wu, "Seismic data compression by an adaptive local cosine/sine transform and its effect on migration", Geophysical Prospecting, vol. 48, pp. 1009-1031, 2000 (hereinafter WWU) and V. A. Zheludev, D. D. Kosloff, E. Y. Ragoza, "Compression of segmented 3D seismic data", International Journal of Wavelets, Multiresolution and Information Processing, vol. 2, no. 3, (2004), 269-281. The following two discrete cosine transforms (hereinafter "DCT") types are used in image compression (see K. R. Rao and P. Yip, *Discrete Cosine Transform*, Academic press, New York, 1990):

1. DCT-II of the signal $f=\{f_n\}_{n=0}^{N-1}$, $N=2^p$, used as the transform step (steps 100a and 110a in FIG. 1a) in the JPEG standard for still image compression, as $$f^{II}(k) = b(k)\sum_{n=0}^{N-1} f_n \cos\left[\frac{k\pi}{N}\left(n+\frac{1}{2}\right)\right], \quad b(k) = \begin{cases} 1/\sqrt{2} & \text{if } k=0 \\ 1 & \text{otherwise} \end{cases}$$

$$f_n^{II} = \frac{2}{N}\sum_{k=0}^{N-1} b(k) f^{II}(k) \cos\left[\frac{k\pi}{N}\left(n+\frac{1}{2}\right)\right].$$

2. DCT-IV of the signal $f=\{f_n\}_{n=0}^{N-1}$, $N=2^p$, used as the transform step (steps 100a and 110a in FIG. 1a) in LCT as $$f^{IV}(k) = \sum_{n=0}^{N-1} f_n \cos\left[\frac{\pi}{N}\left(k+\frac{1}{2}\right)\left(n+\frac{1}{2}\right)\right],$$

$$f_n^{IV} = \frac{2}{N}\sum_{k=0}^{N-1} f^{IV}(k) \cos\left[\frac{\pi}{N}\left(k+\frac{1}{2}\right)\left(n+\frac{1}{2}\right)\right].$$

DCT-IV is a good choice for coding oscillatory signals. The basis functions of DCT-IV are even on the left side with respect to $$-\frac{1}{2}$$

and odd on the right side with respect to $$N - \frac{1}{2}.$$

Therefore, direct application of the DCT-IV to partitioned data leads to severe boundary discrepancies. However, this transform serves as a base for LCTs which are window lapped DCT-IV DCTs. These bases were successfully exploited for image compression in general and seismic data in particular, see e.g. AMSCV, FM, WWU, A. Averbuch, G. Aharoni, R. Coifman and M. Israeli, "Local cosine transform—A method for the reduction of blocking effects in JPEG", Journal of Mathematical Imaging and Vision, Special Issue on Wavelets, Vol. 3, pp. 7-38, 1993 (hereinafter AJPEG) and G. Matviyenko, "Optimized local trigonometric bases", Applied and Computational Harmonic Analysis, 3, 301-323, 1996, (hereinafter MAT).

Assume we have a signal $s=\{s_k\}_{k=0}^{N-1}$ and some partition P of the interval 0: N−1. The idea behind the lapped DCT-IV is to apply overlapped bells to adjacent sub-intervals. Then, the overlapping parts are folded back to the sub-intervals across the endpoints of the sub-intervals and the DCT-IV on each sub-interval is implemented. In the reconstruction phase, the transform coefficients are unfolded. For details, see CMLCT and AMSCV. This transform is called P-based LCT. There are many available bells. Their descriptions are given in CMLCT, AJPEG and MAT. As an example, we use in our experiments the bell $$b(x) = \sin\frac{\pi}{2}\left(x + \frac{1}{2}\right).$$

Wavelet Transforms

The multiscale wavelet transform of a signal is implemented via iterated multirate filtering. One step in the transform of a signal $S=\{s_k\}_{k=0}^{N-1}$ of length N consists of filtering the signal using a half-band low-pass filter L and a half-band high-pass filter H, followed by factor 2 down-sampling of both filtered signals. This produces two blocks of coefficients $w_L^1=\{l_k^1\}_{k=0}^{N/2-1}$ and $w_H^1=\{h_k^1\}_{k=0}^{N/2-1}$, each of length N/2. Coefficients $w_L^1$ include the entire information of the low frequency component of signal S while coefficients $w_H^1$ do the same for the high frequency component. Blocks $w_L^1$ and $w_H^1$ cut the Nyquist frequency band F of the signal $S: F \rightarrow F_L^1 \cup F_H^1$ into half.

The wavelet transform coefficients also have a spatial meaning. The coefficient $l_m^1$ is the result of weighted averaging of the set $S_m^{1,\lambda}$ of signal samples. The set $S_m^{1,\lambda}$ is centered around sample $s_{2m}$ of signal S and its scope $\lambda^1$ is equal to the width of the impulse response (IR) of filter L, provided L is a finite impulse response (FIR) filter. If L is an infinite impulse response (IIR) filter whose IR decays rapidly, then λ equals the effective width of the IR of filter L. The coefficient $h_m^1$ is the result of numerical differentiation of some order d of signal S at point 2m+1. For this, the set $S_m^{1,\chi}$ of signal samples is involved, whose scope $\chi^1$ is equal to the (effective) width of the IR of filter H.

The next step of the wavelet transform applies the pair of filters L and H to the coefficients array $w_L^1$. The filtering is followed by down-sampling. The produced blocks of coefficients $w_L^2 = \{l_k^2\}$ and $w_H^2 = \{h_k^2\}$ from, respectively, L and H, are of length N/4 each, and cut in half the sub-band $F_L^1 \to F_L^2 \cup F_H^2 \Rightarrow F_L \to F_L^2 \cup F_H^2 \cup F_H^1$. In the time domain, coefficient $l_m^2$ is the result from averaging the set of samples $S_m^{2,\lambda}$. The set $S_m^{2,\lambda}$ is centered around sample $s_{4m}$ of signal S and its scope is $\lambda^2 \approx 2\lambda^1$. Similarly, coefficient $h_m^2$ is associated with the set $S_m^{2,\chi}$ of samples, which is centered around sample $s_{4m+2}$ of signal S and its scope is $\chi^2 \approx 2\chi^1$. Note that set $S_m^{2,\lambda}$ occupies approximately the same area as the pair of its "offspring" sets $S_{2m}^{1,\chi}$ and $S_{2m+1}^{1,\chi}$.

Next, this decomposition is iterated to reach scale J. It produces the coefficients array $w^J$ whose structure is $$w^J = w_L^J \cup w_H^J \cup w_H^{J-1} \cup \ldots \cup w_H^1. \quad (1)$$

Respectively, the Nyquist frequency band F is split into sub-bands whose widths are distributed in a logarithmic way to become $$F \to F_L^J \cup F_H^J \cup F_H^{J-1} \cup \ldots \cup F_H^1. \quad (2)$$

The diagram of a three-scale wavelet transform and the layout of the transform coefficients are displayed in FIG. 2.

The wavelet transform of a 2D array $T = \{t_{n,m}\}$ of size N×M is implemented in a tensor product. In other words, the 1D wavelet transform is applied to each side (direction). First, the pair of filters L and H is applied to the columns of T and the results are down-sampled. This yields coefficients arrays L and H of size N/2×M. Then, filters L and H are applied to the rows of L and H. This filtering is followed by down-sampling which results in four sub-array coefficients LL, LH, HL, HH of size N/2×M/2. The 2D Nyquist frequency domain is split accordingly. Then, the above procedure is applied to the coefficient array LL to produce the sub-arrays (LL)LL, (LL)LH, (LL)HL, (LL)HH of size N/4×M/4. Then, this procedure is iterated using (LL)LL instead of LL and so on. The layout of the transform coefficients, which corresponds to the Nyquist frequency partition, for the three-scale wavelet transform, is displayed in FIG. 3.

SPIHT Coding

The coefficients from (LL)LH, LL(HL), LL(HH) as shown in FIG. 3 are produced by the same operations as, respectively, the coefficients of LH, HL, HH. The coefficient $c_{nm}^{llhl} \in$ (LL)HL from the second scale is associated with the set $P_{nm}^{llhl}$ of pixels which is centered around pixel $p_{4n+2,4m}$. Set $P_{nm}^{llhl}$ occupies (approximately) the same area as the four sets $P_{\upsilon,\mu}^{hl}$ which are associated with the first scale coefficients $c_{\upsilon,\mu}^{hl} \in$ HL, $\upsilon = 2n+1, 2n+3$, $\mu = 2m-2, 2m+2$, occupy. In this sense, $c_{\upsilon,\mu}^{hl} \in$ HL are the descendants of coefficient $c_{nm}^{llhl} \in$ (LL)HL. Similar relations exist between the coefficients of LH, HH and (LL)LH, (LL)HH and also between the coefficients of other adjacent scales. These relations are illustrated in FIG. 4.

The ancestor-descendant relationship between wavelet transform coefficients in different scales, where the coefficients are located at the same spatial area as shown in FIG. 4, is exploited in the EZW codec. The EZW codec takes advantage of the self-similarity between wavelet coefficients across the decomposed scales and their decay toward high frequency. The EZW codec relates between the coefficients by using quad-trees. One of most efficient algorithms based on the EZW concept is the SPIHT algorithm. The SPIHT codec adds to the EZW algorithm a set partitioning technique. The SPIHT algorithm combines adaptive quantization of the wavelet coefficients with coding. The SPIHT algorithm presents a scheme for progressive coding of coefficient values when the most significant bits are coded first. This property allows control of the compression rate. The produced bitstream is further compressed losslessly by the application of adaptive arithmetic coding. In this invention, we can use either SPIHT or EZW.

SUMMARY OF THE INVENTION

The invention uses the separate advantages of both the wavelet transform and LCT to provide superior data compression methods. In an embodiment, the wavelet transform is applied to the piece-wise smooth (referred to as "first" or "horizontal") direction of a 2D dataset (e.g. imagery data) and the LCT is applied to the oscillatory (referred to as "second" or "vertical") direction of the 2D dataset (e.g. imagery data) in a first phase which parallels the first phase in FIG. 1a. Specifically, the LCT partitions the imagery data in the vertical direction. The SPIHT (or EZW) codec is utilized in the last two phases in a general compression scheme which includes quantization and entropy coding, FIG. 1b. The mixed use of a wavelet transform and LCT creates a new "hybrid" compression transform, referred to hereinafter as "HCT". The HCT produces mixed LCT and wavelet transform coefficients which are submitted after reordering of the LCT coefficients in a certain order to the SPIHT (or similar) coding for quantization and entropy coding. In some embodiments in which both directions are oscillatory, a LCT is applied to both directions, this also being referred to hereinafter as "HCT". A different LCT may be applied in each direction. In such embodiments, the HCT produces LCT coefficients in both directions. All LCT coefficients are reordered. After reordering of the LCT coefficients in a certain order, they are submitted to the SPIHT (or another codec) coding for quantization and entropy coding.

If (as for example in HS images) the imagery data is 3D, the HCT is applied to 2D planes many times as mentioned above. SPIHT, EZW and other wavelet based codecs achieve high compression ratios by utilizing efficiently the correlation among multiscale decomposition of 2D imagery data, where the wavelet transform is applied in both directions (as in steps 100a and 110a in FIG. 1a). The joint coefficients from the HCT are organized in a way that enables to utilize the correlation among them in multiscale decomposition of the 2D imagery data. Therefore, in the invention, the joint coefficients are organized in a wavelet tree-like by reordering the LCT coefficients to mimic the multiscale decomposition of a 2D wavelet transform, thus utilizing the strength of the EZW or SPIHT codecs.

According to the invention there is provided a method for compression of 2D imagery data comprising the steps of: applying a wavelet transform to the imagery data in a first direction to obtain first direction wavelet transform coefficients, applying a LCT to the imagery data in a second direction orthogonal to the first direction to obtain a plurality Q of blocks of second direction LCT coefficients and processing the wavelet transform coefficients and the Q blocks of LCT coefficients to obtain a 2D compressed image.

In an embodiment, the step of processing includes reordering the Q blocks of LCT coefficients to obtain reordered LCT coefficients.

In an embodiment, the step of processing further includes quantizing the wavelet transform coefficients and the reordered LCT coefficients to obtain quantized coefficients and entropy coding the quantized coefficients to obtain the 2D compressed image.

In an embodiment, the reordering the Q blocks of LCT coefficients includes arranging the LCT coefficients in each block in a bit-wise partitioning according to a logarithmic scale, and rearranging the bit-wise partitioned coefficients between blocks to appear like wavelet transform coefficients.

In an embodiment, the quantizing and entropy coding are done using the SPIHT or EZW codec.

According to the invention there is provided a method for compression of 2D imagery data comprising the steps of: applying a wavelet transform to the imagery data in a first direction to obtain first direction wavelet transform coefficients, applying a LCT to the imagery data in a second direction orthogonal to the first direction to obtain a plurality Q of blocks of second direction LCT coefficients, reordering the Q blocks of LCT coefficients to obtain reordered LCT coefficients, and processing the wavelet transform coefficients and the reordered LCT coefficients to obtain a compressed 2D image.

In an embodiment, the step of reordering the Q blocks of LCT coefficients includes arranging the LCT coefficients in each block in a bit-wise partitioning according to a logarithmic scale, and rearranging the bit-wise partitioned coefficients between blocks to appear like wavelet transform coefficients.

In an embodiment, the step of processing includes quantizing the wavelet transform coefficients and the reordered LCT coefficients to obtain quantized coefficients, and entropy coding the quantized coefficients to obtain the 2D compressed image.

According to the invention there is provided a method for compression of 2D imagery data comprising the steps of: applying a first LCT to the imagery data in a first direction to obtain a plurality Q of blocks of first direction LCT coefficients, applying a second LCT to the imagery data in a second direction orthogonal to the first direction to obtain a plurality R of blocks of second direction LCT coefficients, and processing the first direction Q blocks of LCT coefficients and second direction R blocks of LCT coefficients to obtain a 2D compressed image.

In an embodiment, the first LCT and the second LCT are identical.

In an embodiment, the first LCT and the second LCT are different.

In an embodiment, the step of processing includes reordering the first direction Q blocks of LCT coefficients and second direction R blocks of LCT coefficients to obtain reordered LCT coefficients, quantizing the reordered LCT coefficients to obtain quantized coefficients, and entropy coding the quantized coefficients to obtain the 2D compressed image.

In an embodiment, the reordering the first direction Q blocks of LCT coefficients and second direction R blocks of LCT coefficients to obtain reordered LCT coefficients includes arranging the LCT coefficients in each block in a bit-wise partitioning according to a logarithmic scale, and rearranging the bit-wise partitioned coefficients between blocks to appear like wavelet transform coefficients.

In an embodiment, the imagery data is selected from the group consisting of seismic data, hyperspectral images, fingerprints and multimedia images.

According to the invention there is provided a computer readable medium having stored therein computer executable instructions for compression of 2D imagery data comprising applying a wavelet transform to the imagery data in a first direction to obtain first direction wavelet transform coefficients, applying a LCT to the imagery data in a second direction orthogonal to the first direction to obtain a plurality Q of blocks of second direction LCT coefficients, and processing the wavelet transform coefficients and the Q blocks of LCT coefficients to obtain a 2D compressed image.

According to the invention there is provided a computer readable medium having stored therein computer executable instructions for compression of 2D imagery data comprising: applying a wavelet transform to the imagery data in a first direction to obtain first direction wavelet transform coefficients, applying a LCT to the imagery data in a second direction orthogonal to the first direction to obtain a plurality Q of blocks of second direction LCT coefficients, reordering the Q blocks of LCT coefficients to obtain reordered LCT coefficients, and processing the wavelet transform coefficients and the reordered LCT coefficients to obtain a compressed 2D image.

According to the invention there is provided a computer readable medium having stored therein computer executable instructions for compression of 2D imagery data comprising: applying a first LCT to the imagery data in a first direction to obtain a plurality Q of blocks of first direction LCT coefficients, applying a second LCT to the imagery data in a second direction orthogonal to the first direction to obtain a plurality R of blocks of second direction LCT coefficients, and processing the first direction Q blocks of LCT coefficients and second direction R blocks of LCT coefficients to obtain a 2D compressed image.

In some embodiments of the computer readable medium, the first LCT and the second LCT are identical.

BRIEF DESCRIPTION OF THE DRAWINGS

The invention is herein described, by way of example only, with reference to the accompanying drawings, wherein:

FIG. 1b is a flow chart showing details of the processing step in the method described by FIG. 1a;

FIG. 5c is a flow chart showing details of the processing step in the method described by FIG. 5a;

DETAILED DESCRIPTION OF THE INVENTION

Outline of the HCT

Figure 1A:
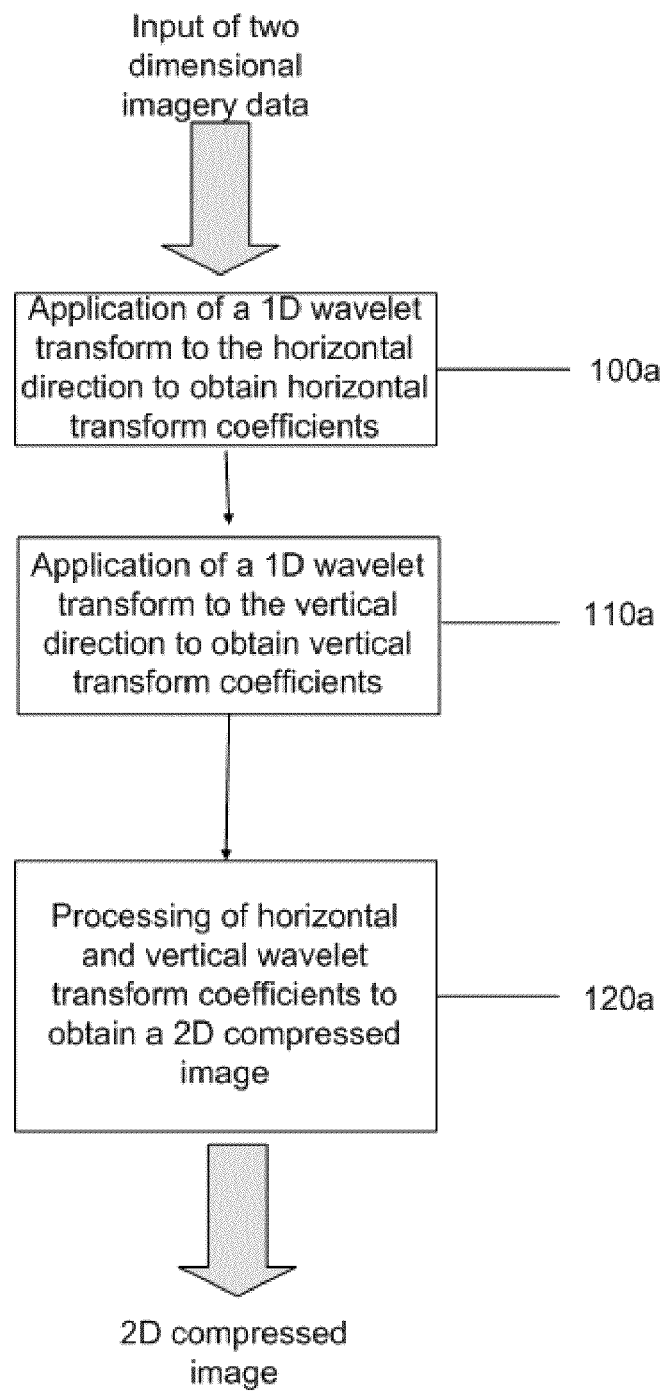
FIG. 1a shows the main steps of a known 2D wavelet based compression scheme of imagery data.
Figure 1B:
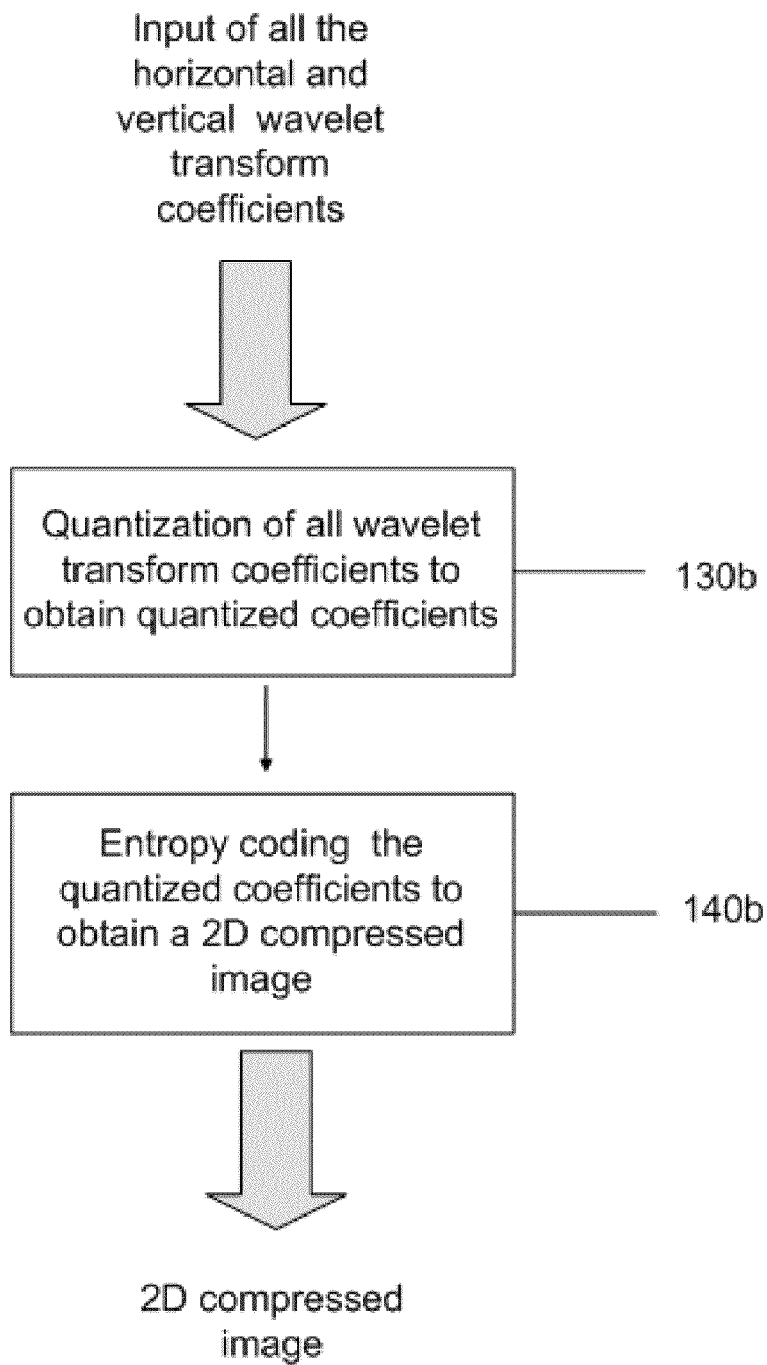
Figure 2:
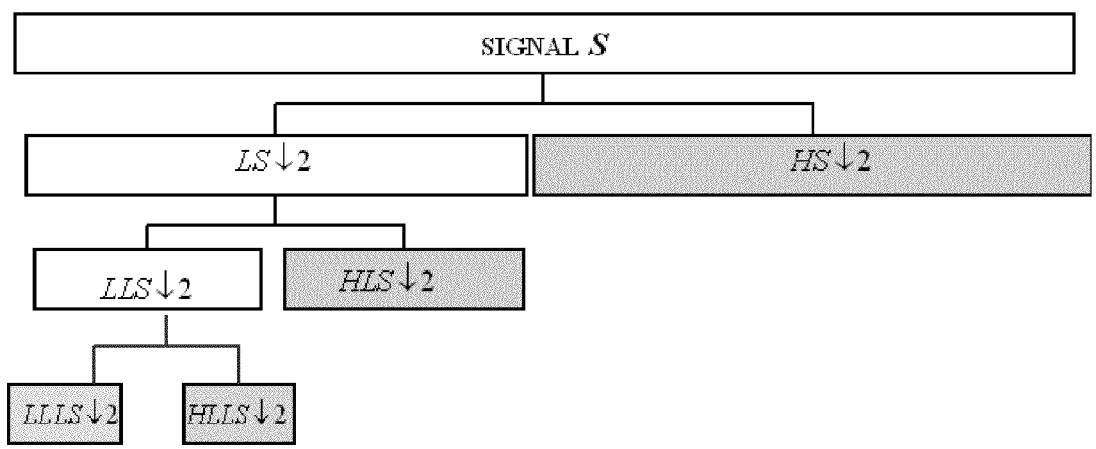
FIG. 2 shows a three-scale wavelet transform and a layout of the transform coefficients.
Figure 2:
Figure 3:
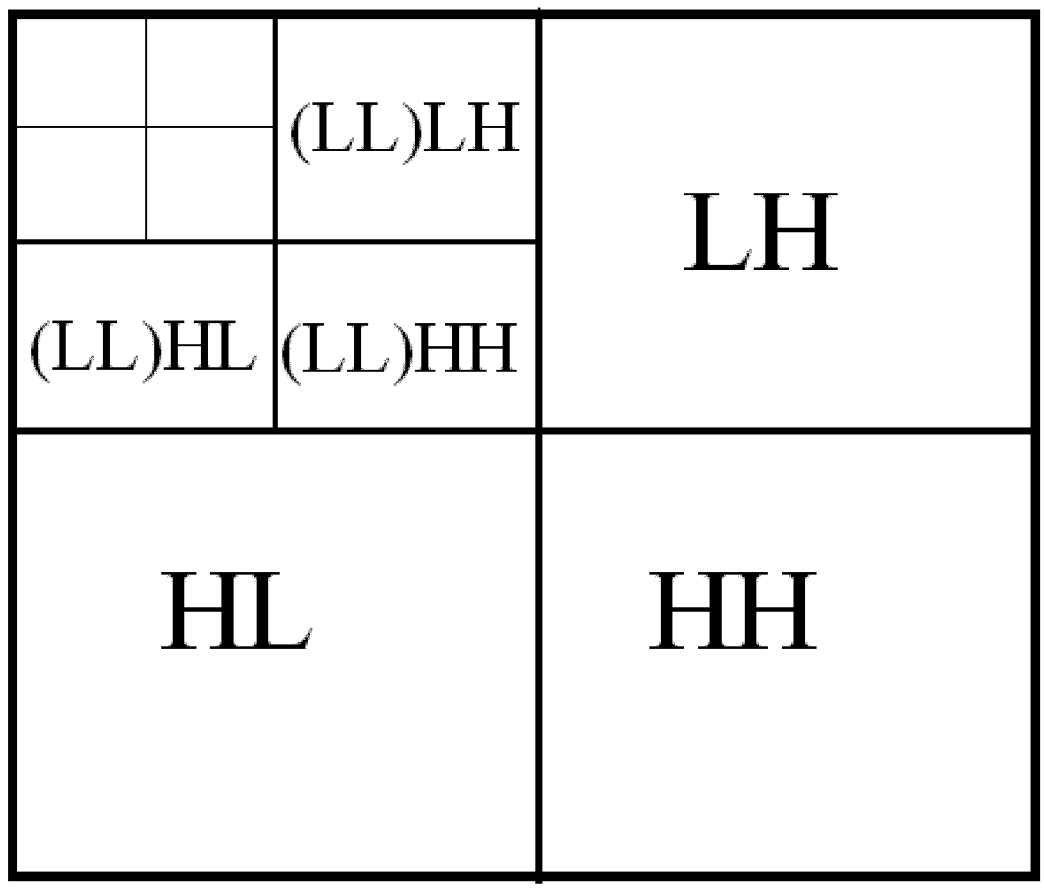
FIG. 3 shows a layout of the coefficients from a three-scale decomposition of a 2D wavelet transform.
Figure 4:
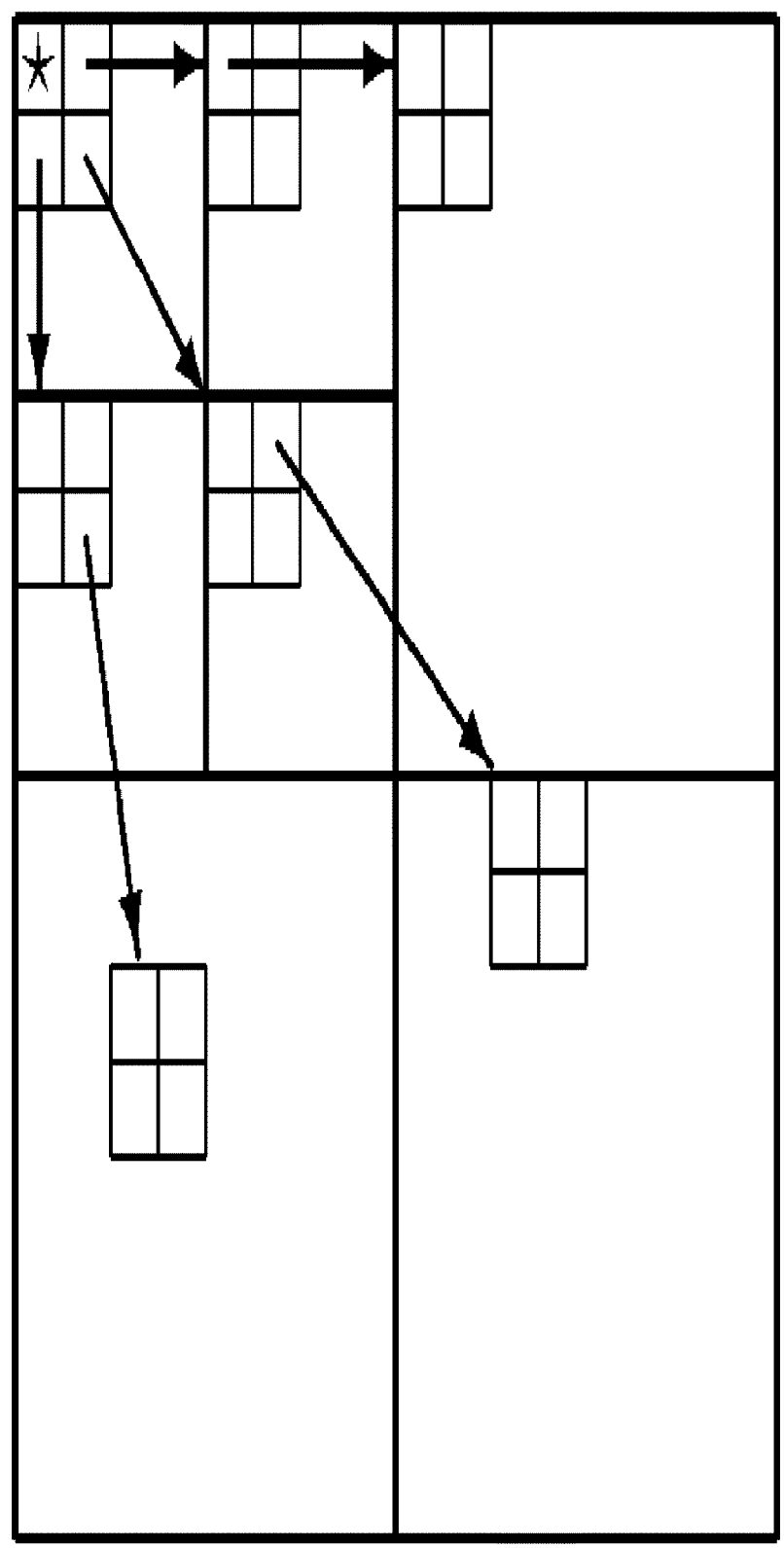
FIG. 4 shows the ancestor-descendant relationship between wavelet transform coefficients in different scales.
Figure 5A:
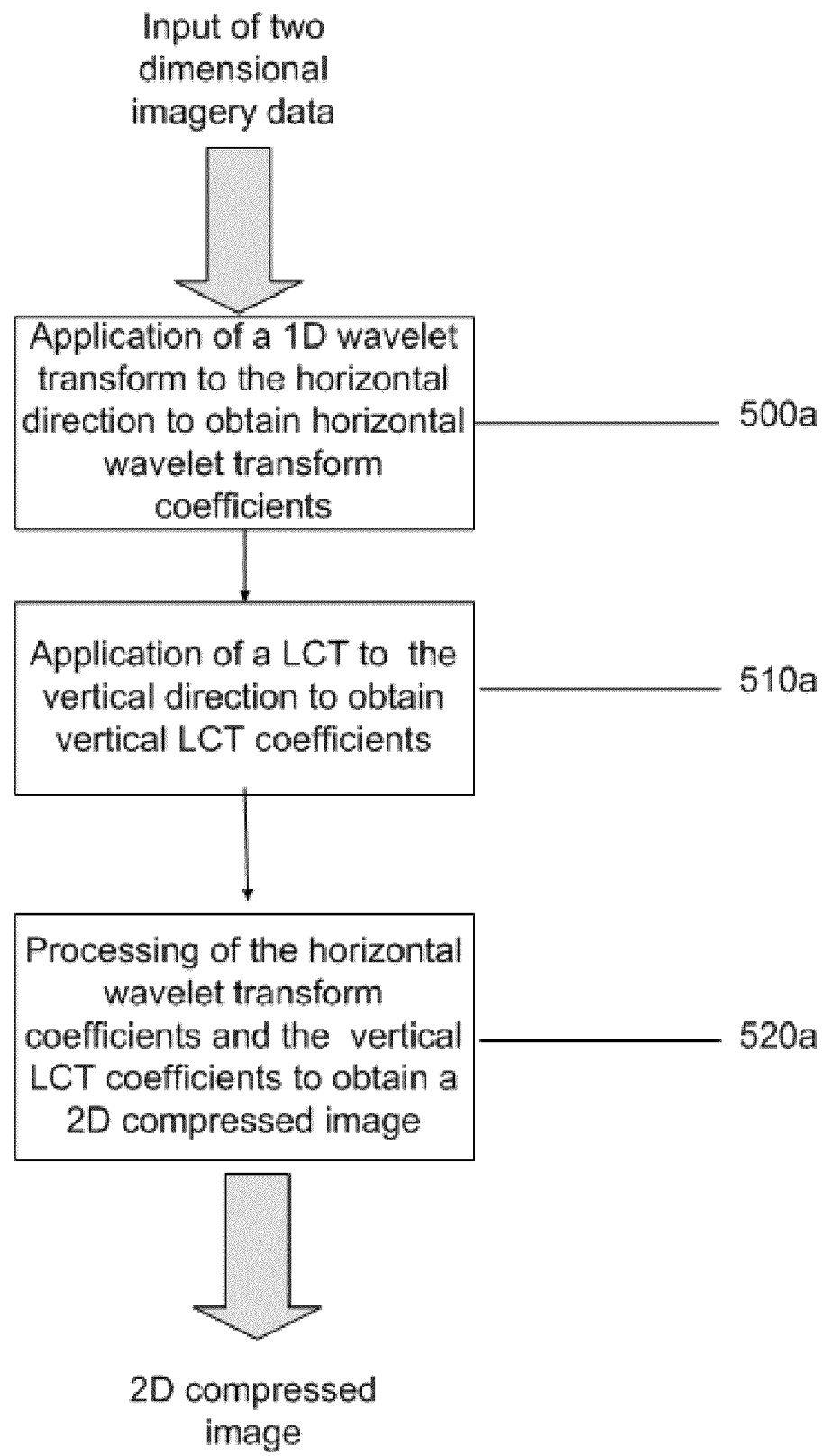
FIG. 5a shows the main steps of the hybrid compression scheme (HCT) of imagery data according to the invention where a wavelet transform is applied to one direction and a local cosine transform (LCT) is applied to the other direction.
Figure 5B:
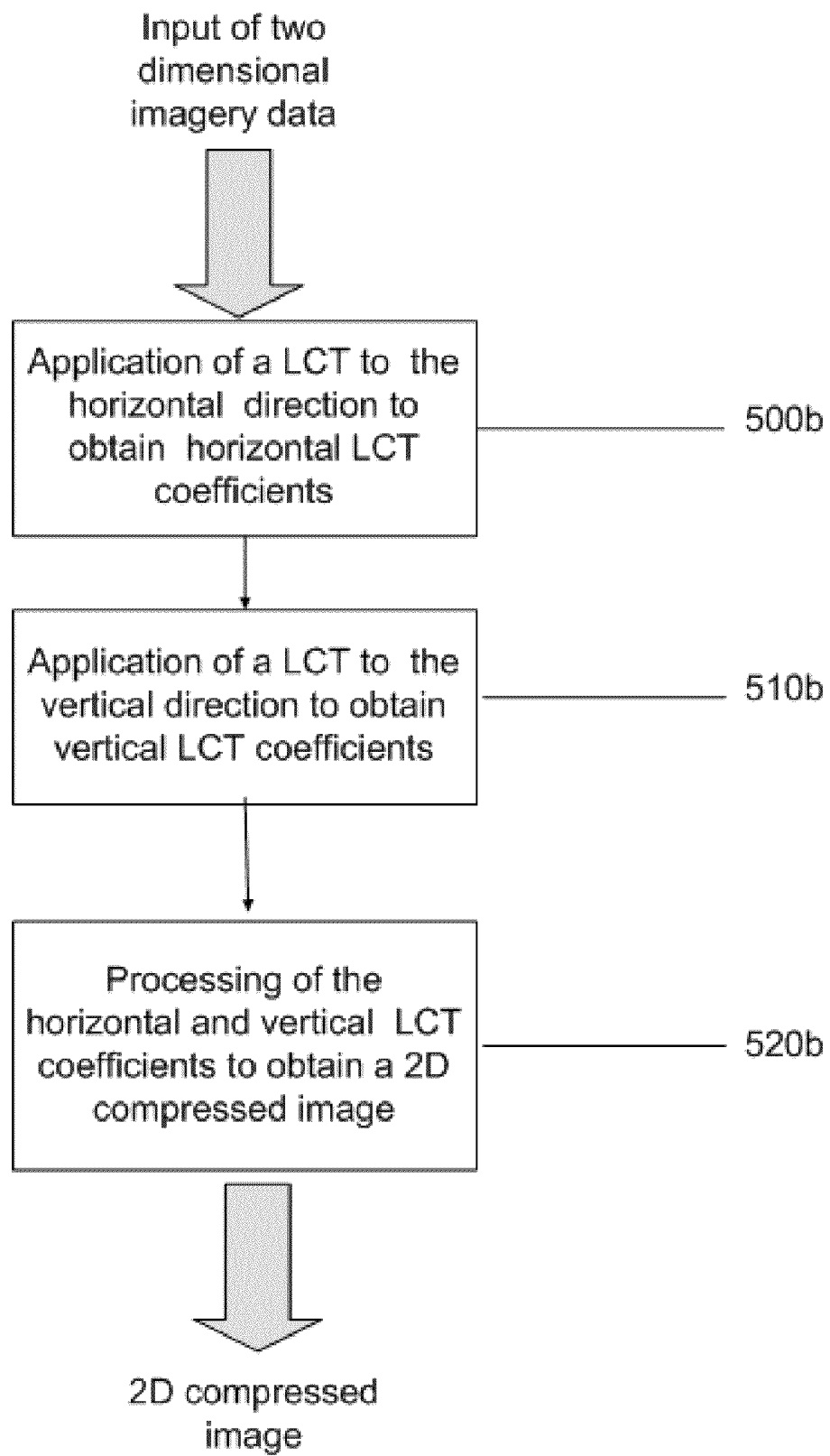
FIG. 5b shows the main steps of the HCT of imagery data according to the invention, where a LCT is applied to both directions.
Figure 5C:
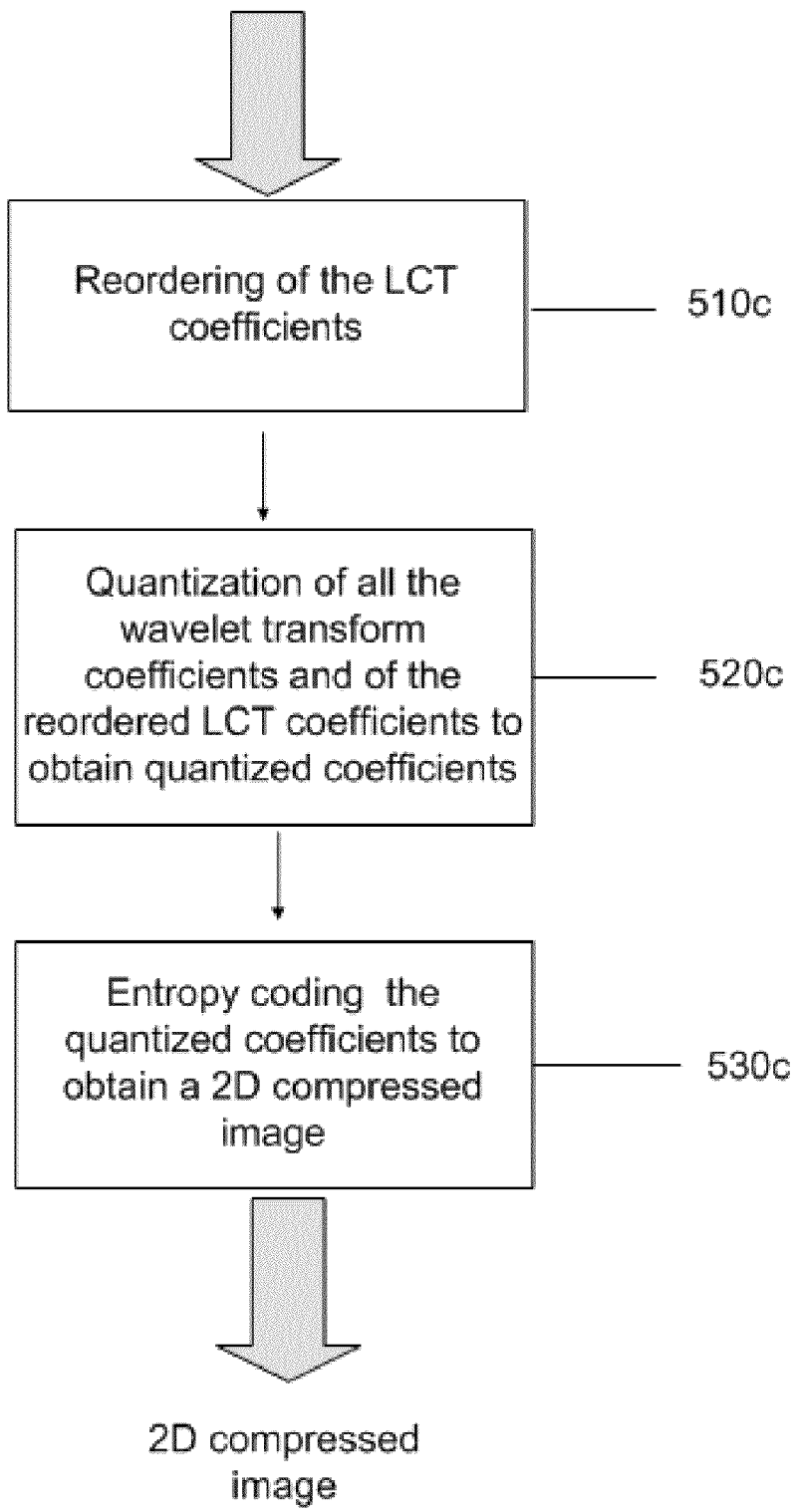
Figure 5D:
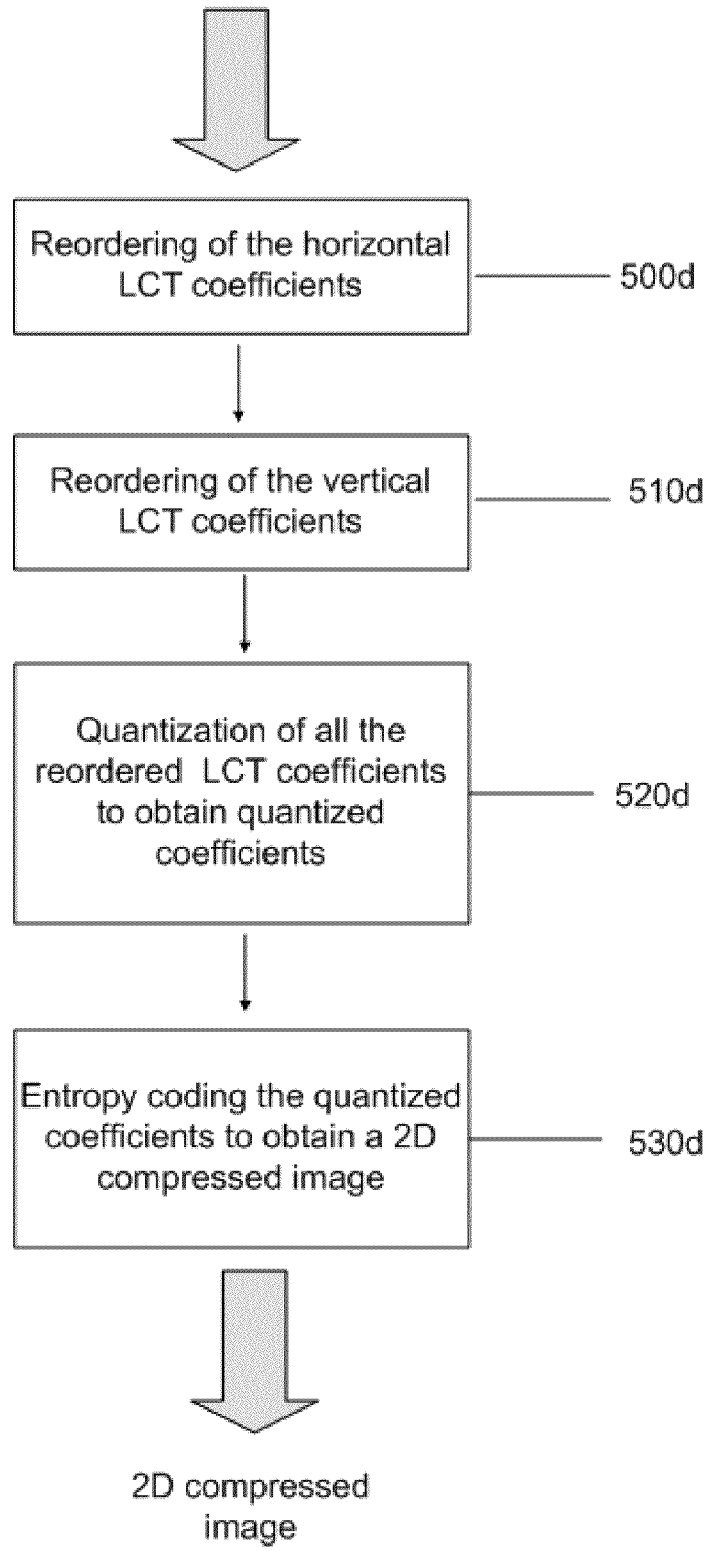
FIG. 5d is a flow chart showing details of the processing step in the method described by FIG. 5b.

The invention provides two HCT method embodiments, one described with reference to the flow chart in FIGS. 5a and 5c and the other described with reference to the flow charts in FIGS. 5b and 5d FIG. 5a shows the main steps of a hybrid compression scheme (HCT method for compression) of imagery data according to the invention. As with the known wavelet transform based methods applied to 2D datasets, this scheme operates on a 2D imagery data input and includes two phases: 1) application of a wavelet transform to the horizontal direction of the image, step 500a in FIG. 5a, followed by the application of a LCT to the vertical direction of the image, step 510a in FIG. 5a, both steps being part of a lossless phase. Steps 500a and 510a produce mixed wavelet and LCT coefficients. The horizontal wavelet transform coefficients and the vertical LCT coefficients are processed to obtain a 2D compressed image, step 520a in FIG. 5a.

FIG. 5c gives details of step 520a. The LCT coefficients are reordered in step 510c. Both wavelet and reordered LCT coefficients are submitted in a certain order to SPIHT (or other codec) coding for quantization and entropy coding. Both wavelet and the reordered LCT coefficients are quantized in a lossy step 520c and entropy coding is applied for packing the quantized coefficients into a compressed form in a lossless phase step 530c. The mixed wavelet and LCT transform coefficients are exemplarily encoded by the SPIHT algorithm. For this, we establish an ancestor-descendent relationship similar to the ancestor-descendent relationships in the 2D multiscale wavelet transform coefficients. The output of step 530c in FIG. 5c is a 2D compressed image. Decompression is done in a reverse order.

FIG. 5b shows the main steps of another hybrid compression scheme (HCT method for compression) of imagery data according to the invention. As with the known wavelet transform based methods applied to 2D datasets, this scheme operates on a 2D imagery data input and includes two phases: 1) application of a LCT to the horizontal direction of the image, step 500b, followed by the application of a LCT to the vertical direction of the image, step 510b, both steps being part of a lossless phase. Steps 500b and 510b produce horizontal and vertical LCT coefficients. The LCTs applied in the horizontal and vertical directions may be identical or different. All LCT coefficients are processed to obtain a 2D compressed image, step 520b.

FIG. 5d gives details of step 520b. The horizontal LCT coefficients are reordered in step 500d. The vertical LCT coefficients are reordered in step 510d. All reordered LCT coefficients are quantized in a lossy step 520d and entropy coding is applied for packing the quantized coefficients into a compressed form in a lossless phase step 530d. The reordered LCT coefficients are exemplarily encoded by the SPIHT algorithm. For this, we establish an ancestor-descendent relationship similar to the ancestor-descendent relationships in the 2D multiscale wavelet transform coefficients. The output of step 530d in FIG. 5d is a 2D compressed image. Decompression is done in a reverse order.

Consider the case where there are $N=2^k Q$ data samples in the vertical direction. After application of the LCT on a column of the data, we obtain Q data blocks corresponding to different vertical portions of the input data, each including $2^k$ transform coefficients which relate to the complete frequency band of the input data. The coefficients $c_i^j$, $i=0, \ldots, 2^k-1$, $j=1, 2, \ldots Q$ where the index j denotes the block number, can be grouped in logarithmic order $$(\{c_0^j\}, \{c_1^j\}, \{c_2^j, c_3^j\}, \{c_4^j, c_5^j, c_6^j, c_7^j\}, \ldots, \{c_{2^{k-1}}^j, \ldots, c_{2^k-1}^j\}), j=1, \ldots, Q. \quad (3)$$

This grouping is similar to the grouping of coefficients in the wavelet transform, except that here the coefficients within a band vary according to frequency instead of according to spatial location. In order to mimic more closely the structure of the wavelet transform we re-sort the coefficients to the order $$(\{c_0^1 c_0^2 \ldots c_0^Q\}, \{c_1^1 c_1^2 \ldots c_1^Q\}, \{c_2^1 c_3^1 c_2^2 c_3^2 \ldots c_2^Q c_3^Q\}, \{c_4^1 c_5^1 c_6^1 c_7^1 c_4^2 c_5^2 c_6^2 c_7^2 \ldots c_4^Q c_5^Q c_6^Q c_7^Q \ldots\}, \ldots, \{c_{2^{k-1}}^1 \ldots c_{2^k-1}^Q\}) \quad (4)$$

In this sorting, the coefficients within a block are related to the frequency band of the block and to the spatial location. This ordering somewhat resembles the ordering of the wavelet transform.

Figure 6:
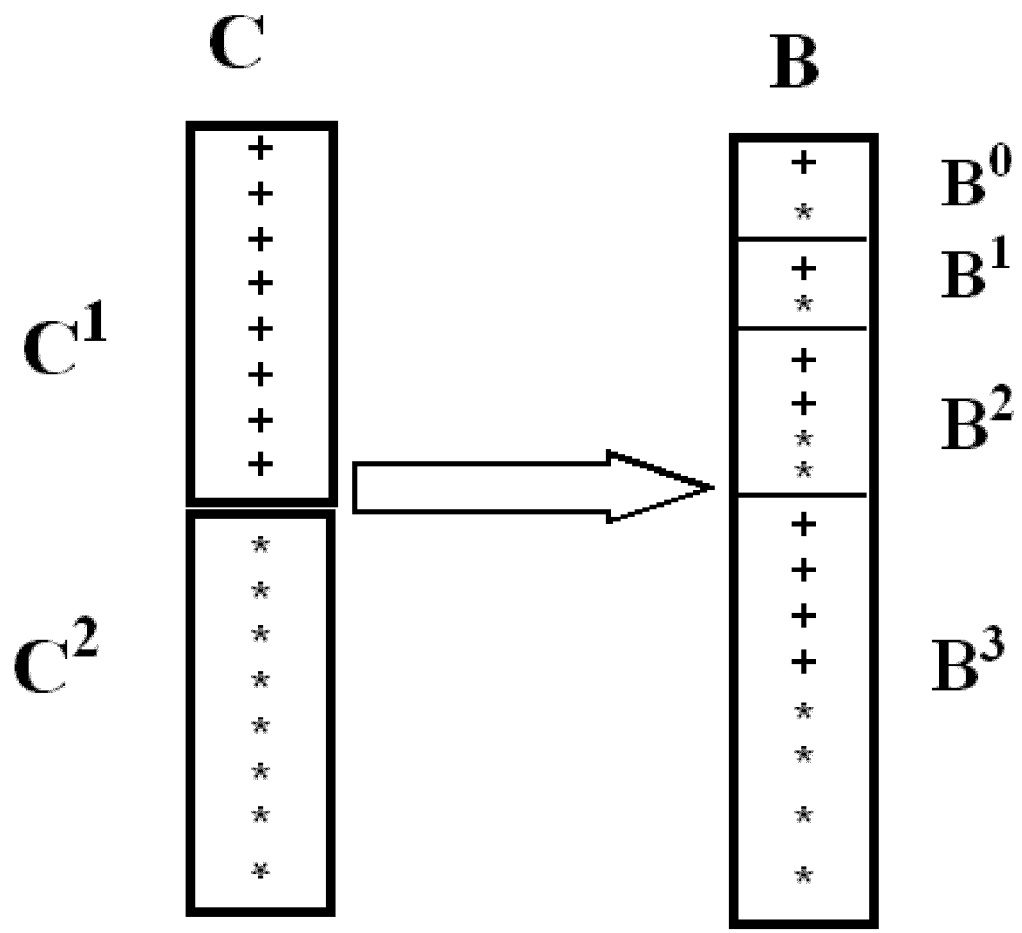
FIG. 6 shows the reordering scheme of the LCT coefficients.

We perform this reordering of the LCT coefficients for all the columns of the transformed input data array. Then, each row of the array is transformed by the wavelet transform. The 2D transform coefficients are ordered in the same manner as the coefficients of the 2D wavelet transform and the same compression schemes can be applied to them. The scales decomposition structure of the array is illustrated in FIG. 6.

The following gives a more detailed description of the various steps in FIGS. 5c and 5d. We reorder the LCT coefficients in a way that mimics the layout of the 2D wavelet transform coefficients. The array of $2^k$ LCT coefficients is separated (partitioned) into k+1 blocks according to a logarithmic scale. For example, for k=4 it is separated in the following way:

$$(c_0|c_1|c_2c_3|c_4c_5c_6c_7|c_8c_9c_{10}c_{11}c_{12}c_{13}c_{14}c_{15})^T. \quad (5)$$

The partition in Eq. (5) appears automatically when the coefficient indices are presented in a binary mode:

$$(c_0|c_1|c_{10}c_{11}|c_{100}c_{101}c_{110}c_{111}|c_{1000}c_{1001}c_{1010}c_{1011}c_{1100}$$
$$c_{1101}c_{1110}c_{1111})^T. \quad (6)$$

Thus, the array is partitioned according to the number of bits in the coefficients indices. We call this a bit-wise partition.

Assume a given N×M data array T, where $N=2^kQ$, $M=2^JR$. We define the partition P of the interval I=[0, 1, . . . , N−1] by splitting it into Q subintervals $$I = \bigcup_{i=1}^{Q} I^i$$

of length $2^k$ each. We apply the P-based LCT transform to each column of T. Thus, array T is transformed into an array C of LCT coefficients. For each column, we obtain the array c of N LCT coefficients, which consists of Q blocks $$c = \bigcup_{i=1}^{Q} c^i,$$

where $c^i = \{c_n^i\}_{n=0}^{2^k-1}$. Each block can be bit-wise partitioned as in Eq. (6):

$$c^i = \bigcup_{\beta=0}^{k} b_\beta^i$$

where $b_0^i = c_0^i, b_1^i = c_1^i$ and $b_\beta^i$ is the set of the coefficients $c_n^i$, whose indices can be represented by β bits. In order to obtain a wavelet-like structure of the array c, we rearrange it in a bit-wise mode $$c \to b = \bigcup_{\beta=0}^{k} b^\beta \quad b^\beta = \bigcup_{i=1}^{Q} b_i^\beta. \quad (7)$$

Thus, we get $b^0 = (c_0^1, c_0^2, \ldots, c_0^Q)^T$, $b^1 = (c_1^1, c_1^2, \ldots, c_1^Q)^T$, $b^2 = (c_2^1, c_3^1; c_2^2, c_3^2; \ldots; c_2^Q, c_3^Q)^T$ and so on. This rearrangement is illustrated in FIG. 6. The structure of the array b is similar to the structure of the coefficients w of the wavelet transform, where the transform is decomposed into the k−1 scale. The similarity relations are $$b^0 \leftrightarrow w_L^{k-1}, b^1 \leftrightarrow w_H^{k-1}, b^2 \leftrightarrow w_H^{k-2}, \ldots,$$
$$b^{k-1} \leftrightarrow w_H^1. \quad (8)$$

The ancestor-descendant relationships in array b are similar to those in w.

We perform this reordering of the LCT coefficients for all the columns of the array C. Thus, we obtain $$C \to B = \bigcup_{\beta=0}^{k} B^\beta \quad B^\beta = \bigcup_{i=1}^{Q} B_i^\beta. \quad (9)$$

Figure 7:
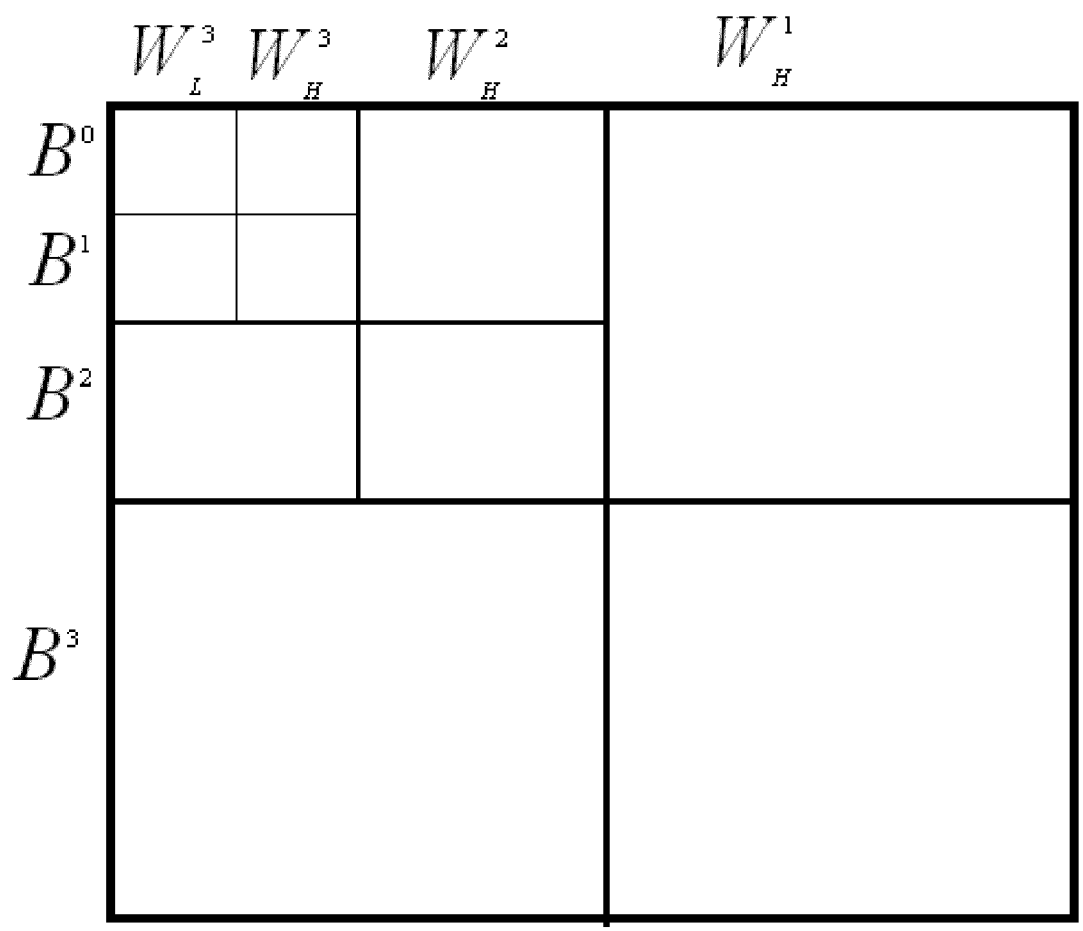
FIG. 7 shows the layout of the LCT-wavelet transform coefficients in three scales.

Then, each row of the array B is decomposed to scale J by the application of the wavelet transform. This produces the HCT coefficient array denoted as CW. The transform that produces the array CW is described by steps 500a, 510a in FIGS. 5a and 510c in FIG. 5c. The array CW is the input to SPIHT, which uses quantization and entropy coding only (steps 520c and 530c in FIG. 5c, respectively). The structure of CW is similar to the structure of a 2D wavelet coefficient array, where the transform on the columns is decomposed to scale k−1, while the transform on the rows is decomposed to scale J. The three scale decomposition structure of the array CW is illustrated in FIG. 7.

Experimental Results

A HCT of the invention was applied to compress different data types. It produced very good results for seismic data, HS, fingerprints and multimedia images. The HCT outperforms compression algorithms based on the application of the 2D wavelet transform followed by either SPIHT or EZW codecs. For comparison, the bit rate in each compression experiment was the same.

The choice of a bell has some effect on the performance of the LCT and, consequently, on the performance of the HCT. A library of bells was introduced in MAT. A comparative study of their effects on the performance of an LCT-based image compression algorithms was given in F. G. Meyer, "Image Compression With Adaptive Local Cosines: A Comparative Study", IEEE Trans. on Image Proc., vol. 11, no. 6, June 2002, pp. 616-629. In our experiments, we implemented the LCT with the "sine" bell $$b(x) = \sin\frac{\pi}{2}\left(x + \frac{1}{2}\right).$$

Other bells may also be used.

The compression algorithms used in the comparison study were:

1. Two known wavelet based algorithms:
   a. W9/7—a 2D wavelet transform which uses 9/7 bi-orthogonal wavelet filters, see MALLAT. The 2D wavelet transform is composed of a single 1D wavelet transform, applied to both horizontal and vertical directions. Since W9/7 is one the most popular filter used in many applications, most of the plots in the figures compare between W9/7 and HCT.
   b. WButt/M—a 2D Butterworth wavelet transform with M vanishing moments. The 2D Butterworth wavelet transform is composed of a single 1D Butterworth wavelet transform applied to both horizontal and vertical directions. The construction and implementation of the Butterworth wavelet transforms were introduced in A. Z. Averbuch, A. B. Pevnyi and V. A. Zheludev, "Butterworth wavelet transforms derived from discrete interpolatory splines: Recursive implementation", Signal Processing, 81, (2001), 2363-2382 called hereinafter BUTTERWORTH. They were embedded into a general spline-based wavelets and frames framework in A. Averbuch, V. Zheludev, "Wavelet and frame transforms originated from continuous and discrete splines", in "Advances in Signal Transforms: Theory and Applications", J. Astola and L. Yaroslavsky eds., pp. 1-56, Hindawi Publishing Corp., NY, 2007.

2. Three transforms—2HCT and on 2D LCT—of the invention:
   a. H9/7/Q—a HCT which uses the 1D wavelet transform that uses the 9/7 bi-orthogonal wavelet transform in the horizontal direction and the LCT in the vertical direction. The LCT uses partition of the section into Q horizontal rectangles. The transform coefficients are reordered as described in the Detailed Description to fit SPIHT encoding.
   b. HButt/M/Q—a HCT which uses the 1D Butterworth wavelet transform with M vanishing moments in the horizontal direction and the LCT in the vertical direction. The LCT uses partition of the vertical direction into Q horizontal rectangles. The transform coefficients are reordered to fit SPIHT encoding as above.
   c. LDCT/Q/R—a non-HCT 2D LCT transform (i.e. 1D LCT transform applied in both directions). If the image is of size n×m, the image can be partitioned into Q×R rectangles where $n=2^k Q$ and $m=2^l R$. In a special case in which the same LCT is applied in both directions, we may optionally have n=m, Q=R, k=l. The LCT transform coefficients are reordered to mimic the wavelet transform coefficients to fit SPIHT encoding.

One measurement which compares among transform performances is the peak-signal-to-noise ratio (PSNR) in decibels:

$$PSNR = 10\log_{10}\left(\frac{NM^2}{\sum_{k=1}^{N}(x_k - \tilde{x}_k)^2}\right) dB, \quad (10)$$

where N is the total number of samples (pixels), $x_k$ is an original sample (pixel), $\tilde{x}_k$ is the reconstructed sample (pixel) and $M=\max_{k=1,\ldots,N}\{|x_k|\}$. The performance of the 2D wavelet transforms (W9/7 and WButt/M) were compared with the performance of two HCTs (H/9/7/Q and HButt/M/Q) while using different wavelets and the 2D LCT. The SPIHT codec was enhanced by inserting an adaptive arithmetic component (lossless compression). The bold numbers in the tables are the best achieved results.

EXAMPLE 1

Seismic Compression: Stacked Common Mid Point (SCMP) Data Section

We used a SCMP data section to examine the performance of the HCT. Each pixel has 32 bits. The following transforms were used: W9/7, WButt/M (M=4), WButt/M (M=10), H9/7/Q (Q=8) and HButt/M/Q (M=10,Q=8) where Q=8 refers to the partition of sections into 8 horizontal data blocks (rectangles) of height 64=512/8 each. The PSNR values after decompression of the stacked CMP seismic section are listed in Table 1. Each pixel has 32 bits.

TABLE 1

| Bit/pixel | Compression Ratio | W9/7 | WButt/4 | WButt/10 | H9/7/8 | HButt/10/8 |
|---|---|---|---|---|---|---|
| 1/4 | 128 | 27.19 | 27.09 | 27.43 | 28.01 | 28.06 |
| 1/2 | 64 | 29.82 | 29.82 | 30.29 | 31.27 | 31.77 |

TABLE 1-continued

| Bit/pixel | Compression Ratio | W9/7 | WButt/4 | WButt/10 | H9/7/8 | HButt/10/8 |
|---|---|---|---|---|---|---|
| 1 | 32 | 33.80 | 34.01 | 34.51 | 37.03 | 37.19 |
| 2 | 16 | 42.00 | 43.02 | 44.89 | 45.84 | 46.38 |

At low bitrates, the performance of the WButt/4 wavelet transform with 4 vanishing moments is close to the performance of the W9/7 transform, which also has 4 vanishing moments. At a compression rate of 1 bpp (bit per pixel) and, especially, at bpp=2, WButt/4 outperforms W9/7. The WButt/10 transform with 10 vanishing moments performs better, producing higher PSNR values than W9/7 and WButt/4. However, the HCTs achieve the best results. HButt/10/8 outperforms all the other transforms, by achieving the highest PSNRs.

Figure 8:
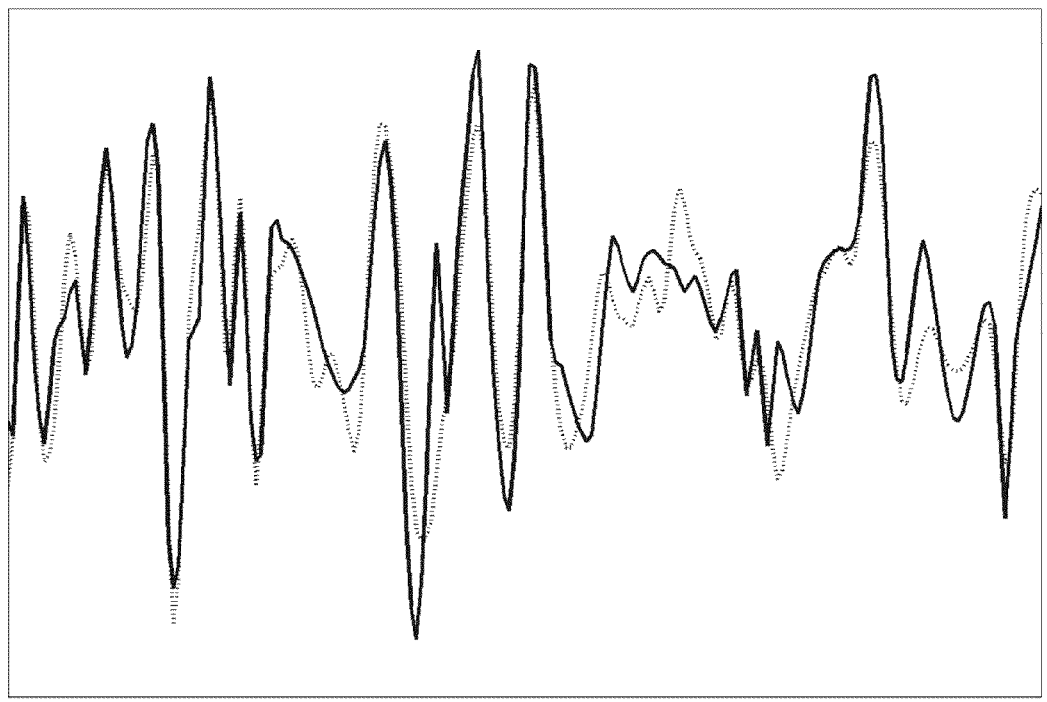
FIG. 8 displays a fragment of trace #200 from an original stacked common mid point data section (dotted line), vs. the fragment from the same trace in the reconstructed section after the application of W9/7 (solid line) with added SPIHT encoding/decoding with ½ bpp.
Figure 9:
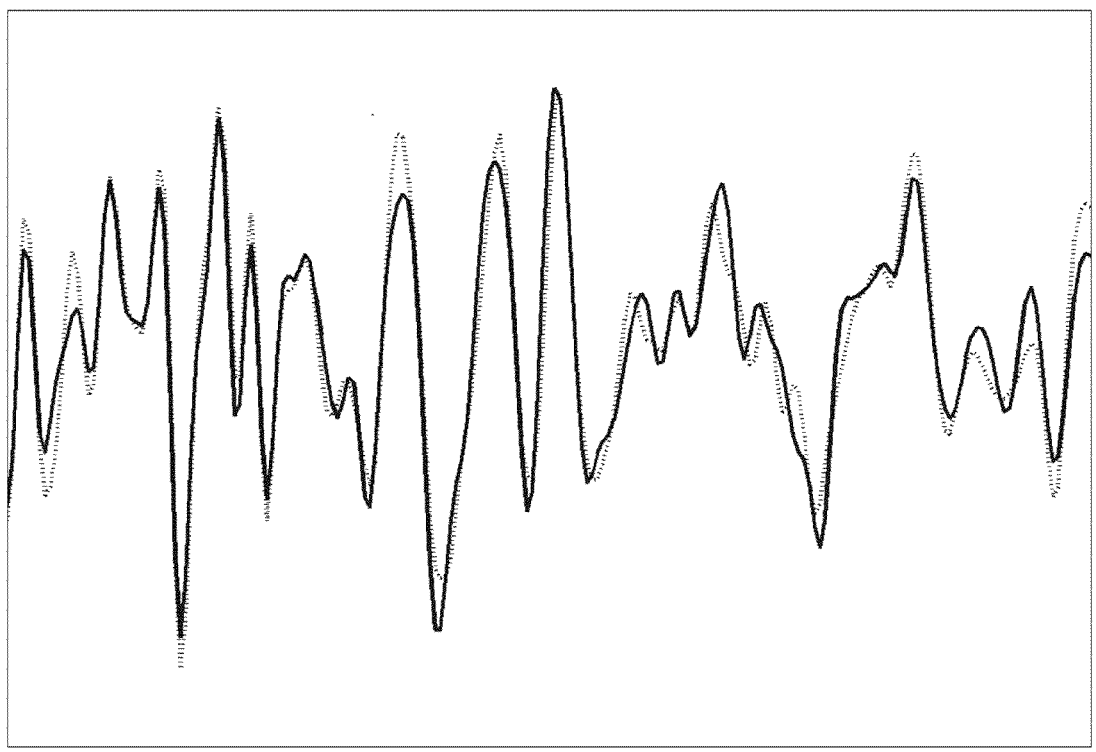
FIG. 9 displays the same fragment as FIG. 8, before (dotted line) and after (solid line) application of HButt/10/8 with added SPIHT encoding/decoding with ½ bpp.

FIGS. 8 and 9 show the differences between original and reconstructed amplitudes of one line. In all such "line figures" (i.e. in FIGS. 8-13, 14, 15 and 18), a dotted line indicates the original data while a solid line indicates the reconstructed (decompressed) data.

FIG. 8 displays a fragment of trace #200 from the original section (dotted line), vs. the fragment from the same trace in the reconstructed section after the application of W9/7 (solid line). FIG. 9 displays the same trace before (dotted line) and after (solid line) application of HButt/10/8. One clearly sees that the match in FIG. 9 is much better than the match in FIG. 8.

EXAMPLE 2

Seismic Compression: Marine Shot Gather (MSG) Data Section

For another seismic experiments, we used a MSG data section of size 640×512. The PSNR of this data is lower than that of the stacked section even when the subsurface layers are not that distinct. As before, we compared the performance of three 2D wavelet transforms (W9/7, WButt/4 and WButt/10) with those of two HCTs which use different wavelets (H9/7/10 and HButt/10/10). Each data pixel has 32 bits. The only difference vs. SCMP was that the HCT algorithms used Q=10 instead of Q=8. The achieved PSNR values are presented in Table 2.

TABLE 2

| Bit/pixel | Compression ratio | W9/7 | WButt/4 | WButt/10 | H9/7/10 | HButt/10/10 |
|---|---|---|---|---|---|---|
| 1/4 | 128 | 26.18 | 25.96 | 26.12 | 26.51 | 26.59 |
| 1/2 | 64 | 27.99 | 27.76 | 27.90 | 28.78 | 29.04 |
| 1 | 32 | 31.63 | 31.32 | 31.57 | 32.52 | 32.76 |
| 2 | 16 | 37.71 | 37.42 | 37.77 | 39.91 | 40.04 |

Table 2 shows that the performances of the wavelet transforms are close to each other, with W9/7 having a small advantage (slightly higher PSNRs). As with SCMP, the HCTs perform much better, with the HButt/10/10 outperforming H9/7/10.

Figure 10:
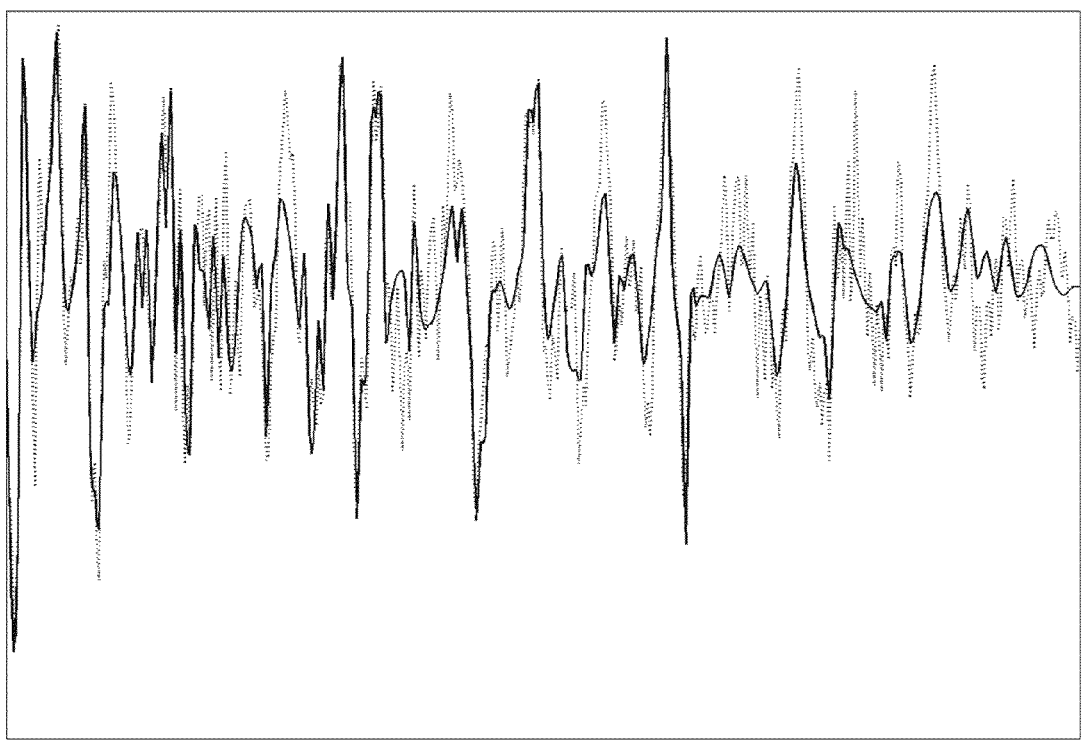
FIG. 10 displays a fragment of a trace #300 from an original marine shot gather (MSG) data section (dotted line) vs. the fragment from the section reconstructed after the application of W9/7 (solid line) with added SPIHT encoding/decoding with 1 bpp.
Figure 11:
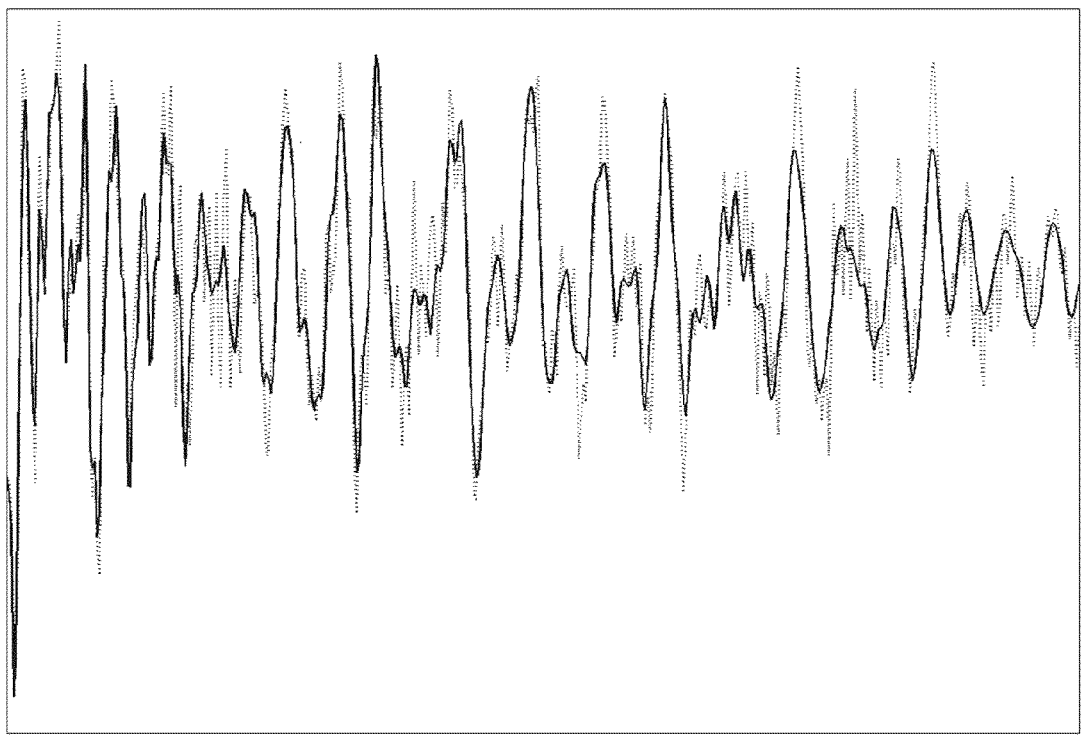
FIG. 11 displays the same fragment as FIG. 10, before (dotted line) and after (solid line) application of HButt/10/10 with added SPIHT encoding/decoding with 1 bpp.

FIGS. 10 and 11 parallel respectively FIGS. 8 and 9 and show the differences between original and reconstructed amplitudes of a single line. FIG. 10 displays a fragment of a trace #300 from the original MSG section vs. the fragment from the section reconstructed after the application of W9/7. FIG. 11 does the same by using the fragment from the section reconstructed after the application of HButt/10/10. The reconstructed trace (solid line) in FIG. 11 is much closer to the original trace (dotted line) in comparison with the trace in FIG. 10.

Figure 12:
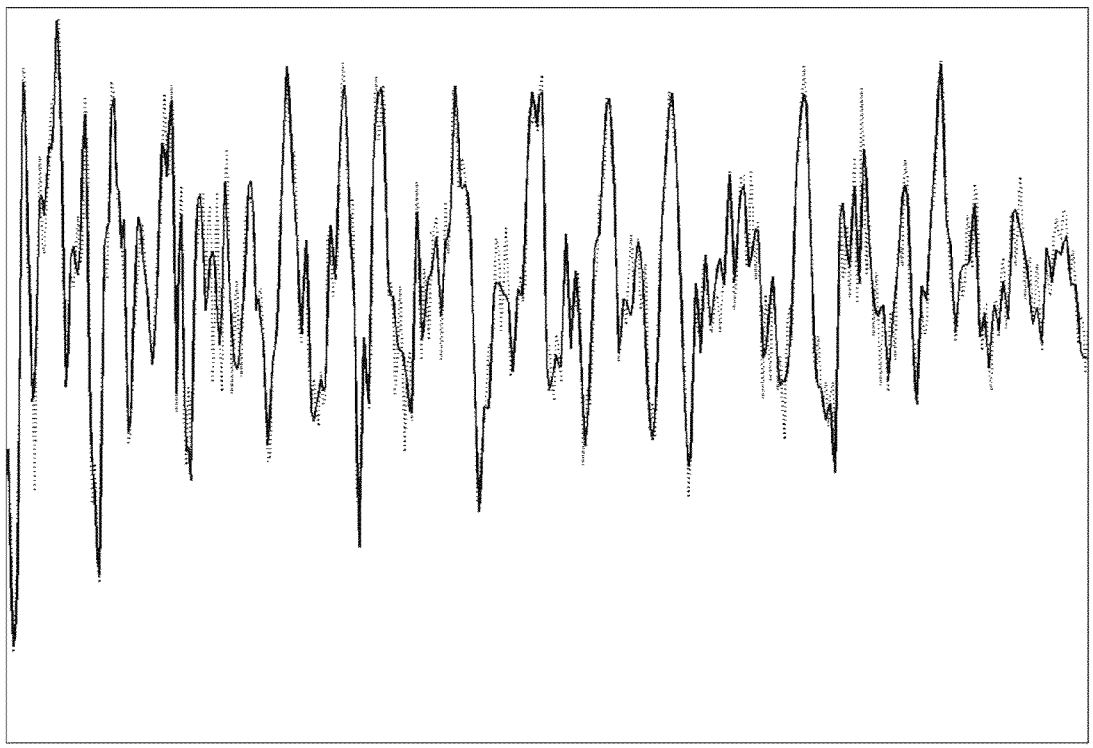
FIG. 12 displays the same fragment as FIG. 10, before (dotted line) and after (solid line) application of W9/7 with added SPIHT encoding/decoding with 2 bpp compression rate.
Figure 13:
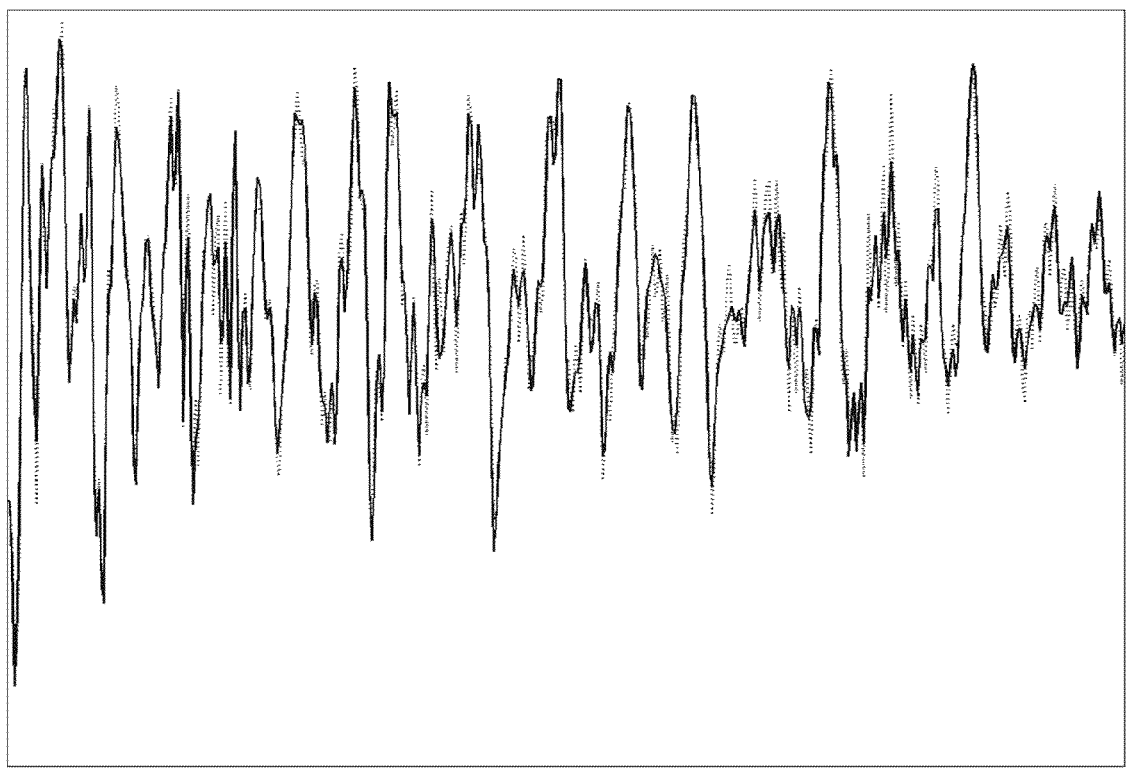
FIG. 13 displays the same fragment as FIG. 10, before (dotted line) and after (solid line) application of HButt/10/10 with added SPIHT encoding/decoding with 2 bpp compression rate.

The same fragment as in FIGS. 10 and 11 is shown in FIG. 12 before (dotted line) and after application (solid line) of W9/7 and SPIHT encoding/decoding using 2 bpp compression rate (compression ratio 16). The same fragment is shown in FIG. 13 before (dotted line) and after application (solid line) of HButt/10/10 and SPIHT encoding/decoding using 2 bpp. 2 bpp provides better accuracy, and it is seen that HButt/10/10 restored all the seismic events more accurately than W9/7.

In conclusion, for seismic data, the HCT algorithms significantly outperform 2D wavelet transform compression algorithms.

HS Data Compression

The HCT was applied to HS images. A HS image is treated as a 3D data cube where X,Y are the spatial axes and Z is the waveband axis. 3D data cubes were captured by a camera in a plane which took simultaneously images of the ground surface in many (≈200) wavebands. Thus, a spectrum of intensities for all the wavebands is assigned to each spatial pixel, forming a "multipixel". When HS data is compressed, it is important to preserve the spectral characteristic features of the multipixels. We compressed the 2D X-Z "plane" of a data cube by applying the HCT followed by the application of SPIHT encoding. To further improve the scheme by utilizing the Y-axis redundancy, the differences between two consecutive planes along the Y-axis were also compressed, i.e. we subtracted each frame from its previous one and compressed the difference. Assume that a HS data cube includes z wavebands where each waveband is an image of size x·y. Then, we look at this data cube as y 2D images of sizes z·x. Each 2D image from the y images is compressed by the application of the algorithm. The compression is done in real-time with no buffering since it is applied to each 2D image as it captured by the HS camera.

Denote each of the 2D images by $I_i$, i=1, ..., y. The quality of the compression is enhanced by compressing the differences among neighboring 2D images (as in video compression) using the following procedure: $I_i$, i=1, is compressed by the application of the HCT followed by the application of SPIHT. Then, $I_i$, i=1, is reconstructed and the difference $I_{i+1} - I_i$, i=1, is compressed. The same procedure repeats itself for i=3, ..., y. This type of compression is called hereinafter "differential compression".

We applied the compression algorithm to two different HS data cubes: 1) urban scenery which has many details and thus many oscillatory patterns and is consequently more difficult to compress, and 2) rural scenery, which has fewer details and a smoother structure and is thus easier to compress. Each pixel in the source HS cube has 16 bpp.

EXAMPLE 3

HS Data Compression of Urban Scene

Table 3 compares between the performances of the HCT and of the standard 2D wavelet transform followed by the application of SPIHT, using PSNR values. The table lists the averaged PSNR values of the HS compression of X-Z planes without utilizing a differential compression between consecutive frames. The PSNR values are averaged over 200 X-Z planes.

TABLE 3

| Bit/pixel | Compression ratio | W9/7 | WButt/4 | WButt/10 | H9/7/16 | HButt/4/16 |
|---|---|---|---|---|---|---|
| 1/4 | 64 | 27.47 | 27.52 | 27.52 | 31.06 | 31.31 |
| 1/2 | 32 | 31.09 | 31.10 | 31.05 | 36.56 | 36.82 |
| 1 | 16 | 36.29 | 36.29 | 35.96 | 43.28 | 43.38 |
| 2 | 8 | 44.99 | 44.90 | 44.30 | 51.01 | 51.23 |

Table 4 lists the averaged PSNR values of differential HS compression of the X-Z urban plane after differential compression.

TABLE 4

| Bit/pixel | Compression Ratio | W9/7 | WButt/4 | WButt/10 | H9/7/16 | HButt/4/16 |
|---|---|---|---|---|---|---|
| 1/4 | 64 | 26.72 | 26.84 | 26.76 | 31.80 | 32.25 |
| 1/2 | 32 | 31.11 | 31.06 | 30.93 | 37.43 | 38.02 |
| 1 | 16 | 37.91 | 37.90 | 37.49 | 43.90 | 44.08 |
| 2 | 8 | 46.76 | 46.71 | 46.12 | 51.82 | 51.92 |

Figure 14:
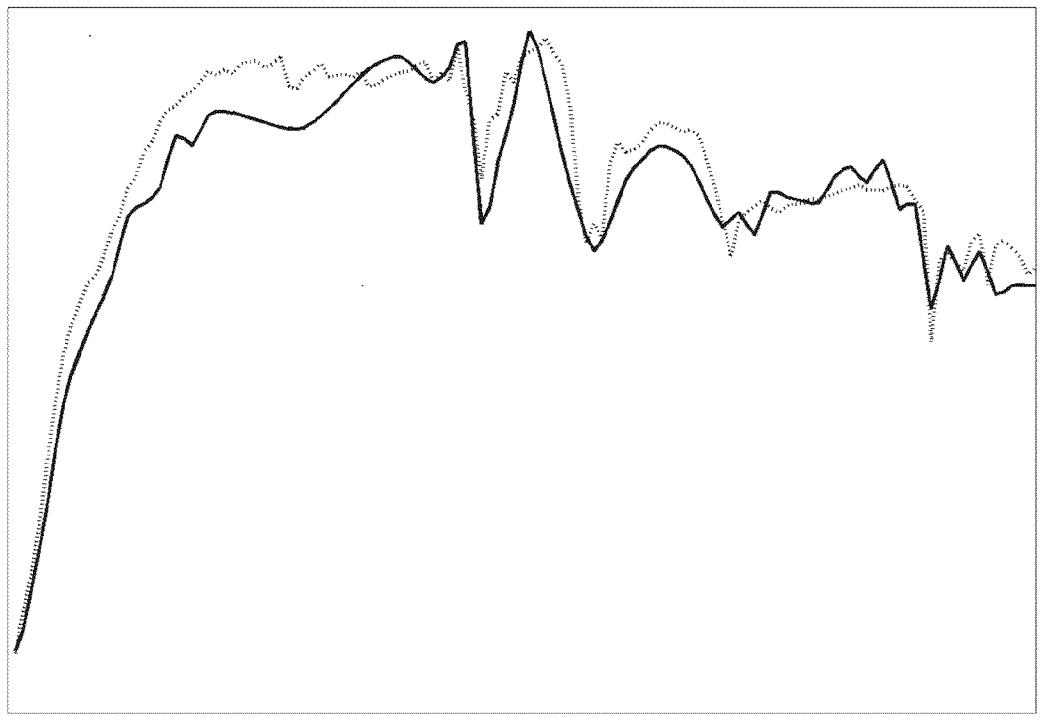
FIG. 14 displays multipixel #200 from a multipixel plane X-Z of a HS image of an urban scene before (dotted line) and after application (solid line) of: a) W9/7 and b) HButt/4/16, both with added SPIHT encoding/decoding with 0.5 bpp compression rate.
Figure 14:
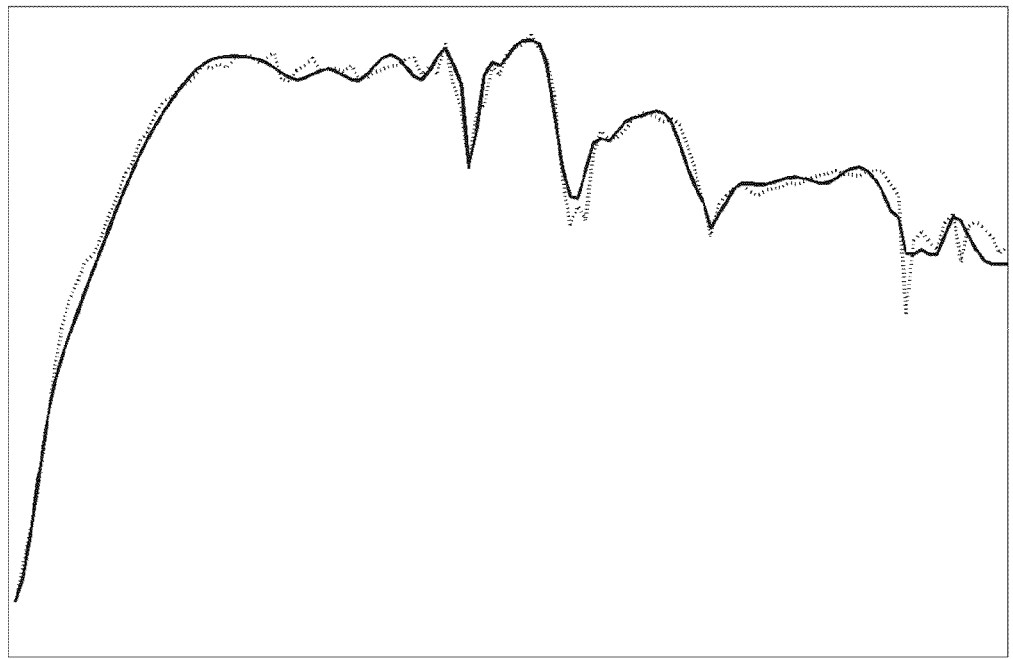

Although the W9/7 transform produces in general the best PSNR values among the three wavelet transforms, the two HCTs outperform it. In addition, the HCTs retain the spectral features much better than wavelet transforms. This is seen in FIG. 14, which displays a multipixel from plane #200, which was reconstructed after the application of (a) W9/7 and (b) HButt/4/16 followed by SPIHT encoding/decoding for 0.5 bpp compression rate. For the HCT case (b), almost all the "events" in the original data (dotted line) are present also in the reconstructed signal after the application of the HCT (solid line). This is not the case for the 2D wavelet transform W9/7 in (a).

EXAMPLE 4

HS Data Compression of Rural Scene

Table 5 displays the PSNR values averaged over 200 X-Z planes after the application of different transforms without utilizing the differential compression among consecutive wavebands.

TABLE 5

| Bit/pixel | Compression Ratio | W9/7 | WButt/4 | WButt/10 | H9/7/16 | HButt/4/16 |
|---|---|---|---|---|---|---|
| 1/4 | 64 | 29.12 | 28.94 | 28.73 | 31.74 | 31.88 |
| 1/2 | 32 | 32.43 | 32.30 | 31.90 | 36.33 | 36.70 |
| 1 | 16 | 36.94 | 36.80 | 36.46 | 42.06 | 41.90 |
| 2 | 8 | 44.10 | 43.81 | 43.24 | 59.75 | 49.78 |

Table 6 displays the PSNR values averaged over 200 X-Z planes after the application of different transforms while utilizing differential compression.

TABLE 6

| Bit/pixel | Compression Ratio | W9/7 | WButt/4 | WButt/10 | H9/7/16 | HButt/4/16 |
|---|---|---|---|---|---|---|
| 1/4 | 64 | 30.87 | 30.82 | 30.75 | 34.39 | 38.58 |
| 1/2 | 32 | 34.37 | 34.26 | 34.19 | 38.30 | 38.49 |
| 1 | 16 | 39.63 | 39.40 | 39.20 | 43.77 | 43.88 |
| 2 | 8 | 47.53 | 47.32 | 47.00 | 51.951 | 51.02 |

Here, unlike in the urban scene example, the PSNR values from the compression/decompression schemes which utilize the difference between consecutive wavebands planes are significantly higher than the schemes which do not utilize it. Unlike the urban scene, the rural scene is smoother and adjacent X-Z planes are similar to each other.

Figure 15:
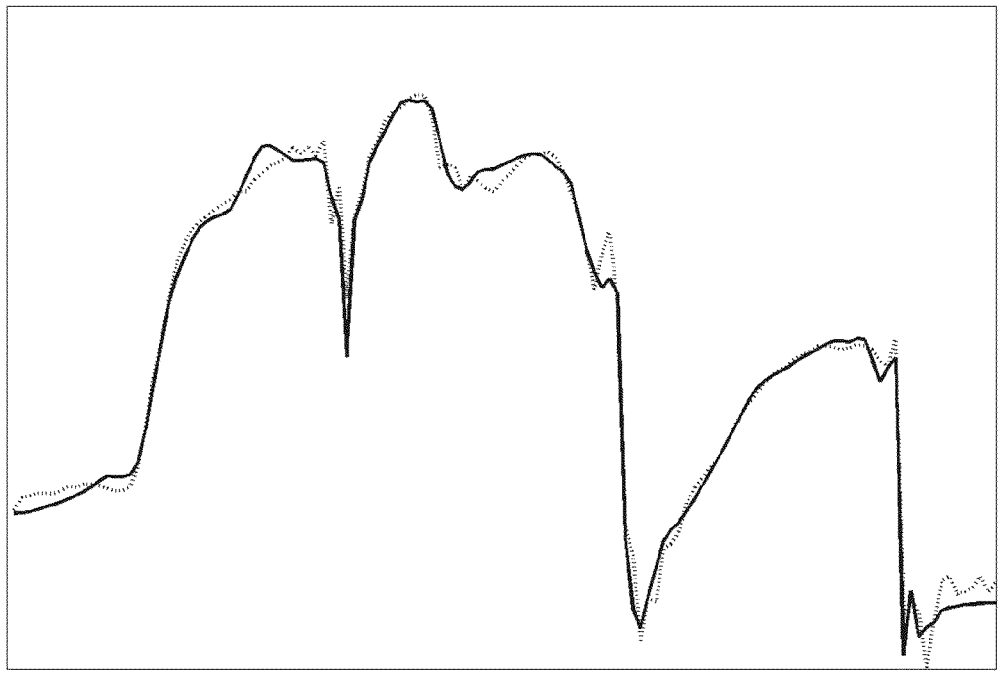
FIG. 15 displays multipixel #100 from a multipixel plane X-Z of a HS image of a rural scene before (dotted line) and after application (solid line) of: a) W9/7 and b) HButt/4/16, both with added SPIHT encoding/decoding with 0.5 bpp compression rate.
Figure 15:
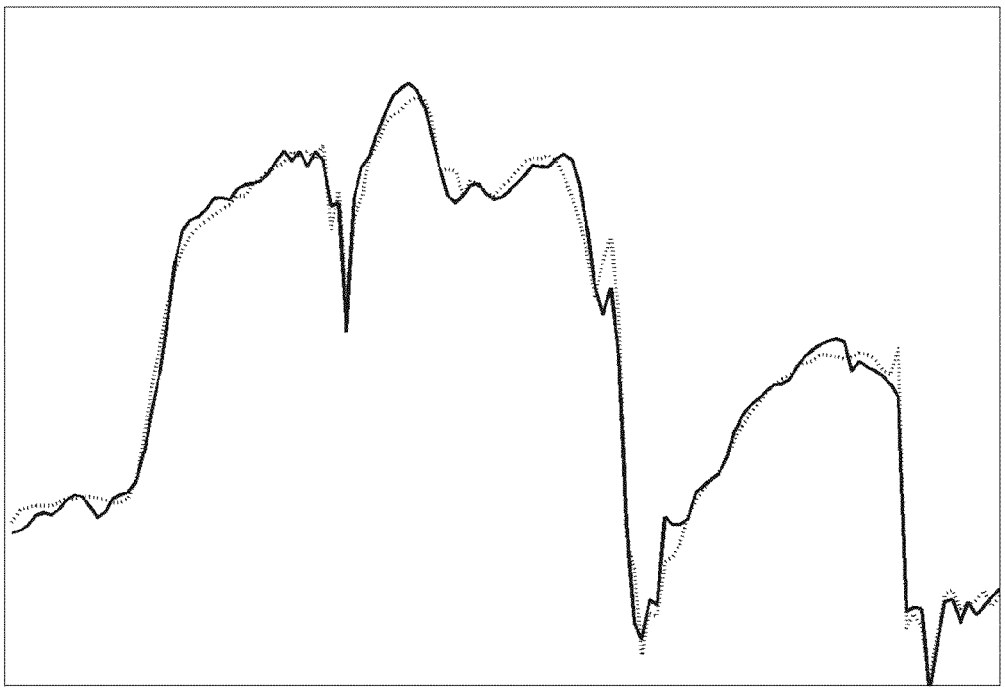

FIG. 15 displays a multipixel from plane #100, which was reconstructed after the application of (a) W9/7 and (b) HButt/4/16 followed by SPIHT encoding/decoding for 0.5 bpp compression rate. The reconstructed line (solid line) in (b) is closer to the original signal (dotted line) in (b) than the result in (a).

In conclusion, as in the case of the seismic data, the HCT algorithms significantly outperform the 2D wavelet transform algorithms in HS data compression.

EXAMPLE 5

Fingerprints

Figure 16:
FIG. 16 displays an original fingerprint: (a) whole image and (b) a fragment of the image.
Figure 16:

The HCT algorithm was applied to a fingerprint image of size 768×512, shown in FIG. 16 (a). FIG. 16(b) is a fragment of the image in FIG. 16 (a). Each pixel has 8 bits. The image has an oscillating structure in each direction. Therefore, a 2D LCT transform, denoted as LDCT/24/16, was applied followed by the SPIHT-adapted reordering of the transform coefficients. We compared between the performance of this transform and the performance of two 2D wavelet transforms (W7/7 and WButt/10) and two HCTs (H9/7/24 and HButt/10/24), where Q=24. The achieved PSNR values are given in Table 7.

TABLE 7

| Bit/pixel | Compression Ratio | W9/7 | WButt/10 | H9/7/24 | HButt/10/24 | LDCT/24/16 |
|---|---|---|---|---|---|---|
| 1/8 | 64 | 23.34 | 24.09 | 23.86 | 24.29 | 23.41 |
| 1/4 | 32 | 25.71 | 26.43 | 26.44 | 26.64 | 26.23 |
| 1/2 | 16 | 29.31 | 29.87 | 29.90 | 29.83 | 29.87 |
| 1 | 8 | 33.29 | 33.77 | 33.80 | 34.08 | 34.42 |

Figure 17:
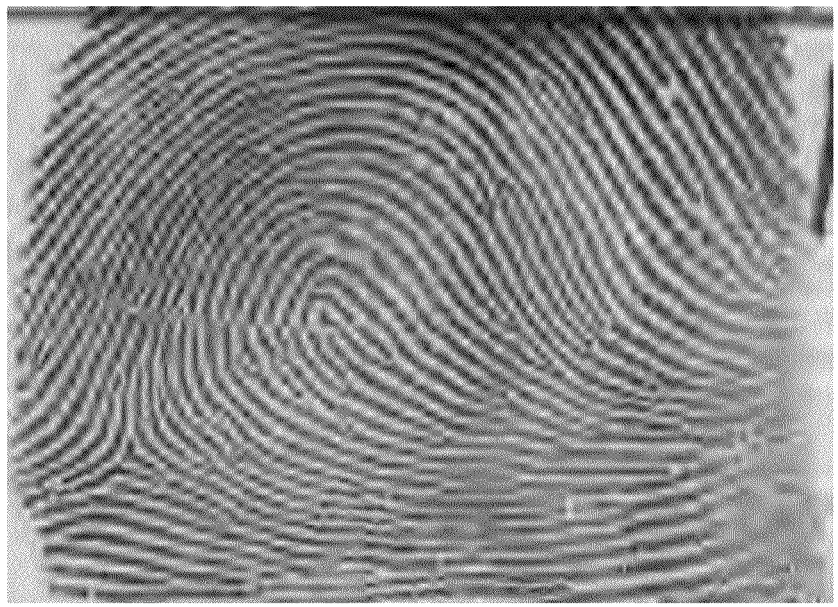
FIG. 17 displays a reconstructed image of the fingerprint fragment in FIG. 16(b) using (a) W9/7 and (b) HButt/10/24, both with added SPIHT with ⅛ bpp compression rate.
Figure 17:
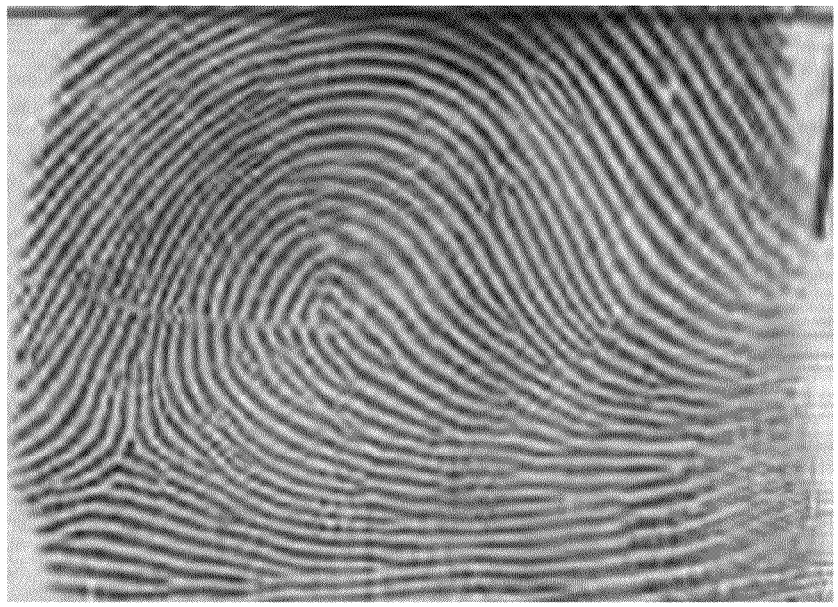

Table 7 shows that WButt/10 outperforms W9/7, especially at the low bitrates. However, the best transform for a low bitrate is HButt/10/24. At higher bitrates, LDCT/24/16 is the best. FIG. 17 displays the fragments of the reconstructed fingerprint image after (a) the application of W9/7 and (b) the application of HButt/10/24, where the coefficients were coded by SPIHT with a 1/8 bpp compression rate. The fragment from the HButt/10/24 transformed section retains much better the structure of the data than the fragment from the W9/7 transform.

Figure 18:
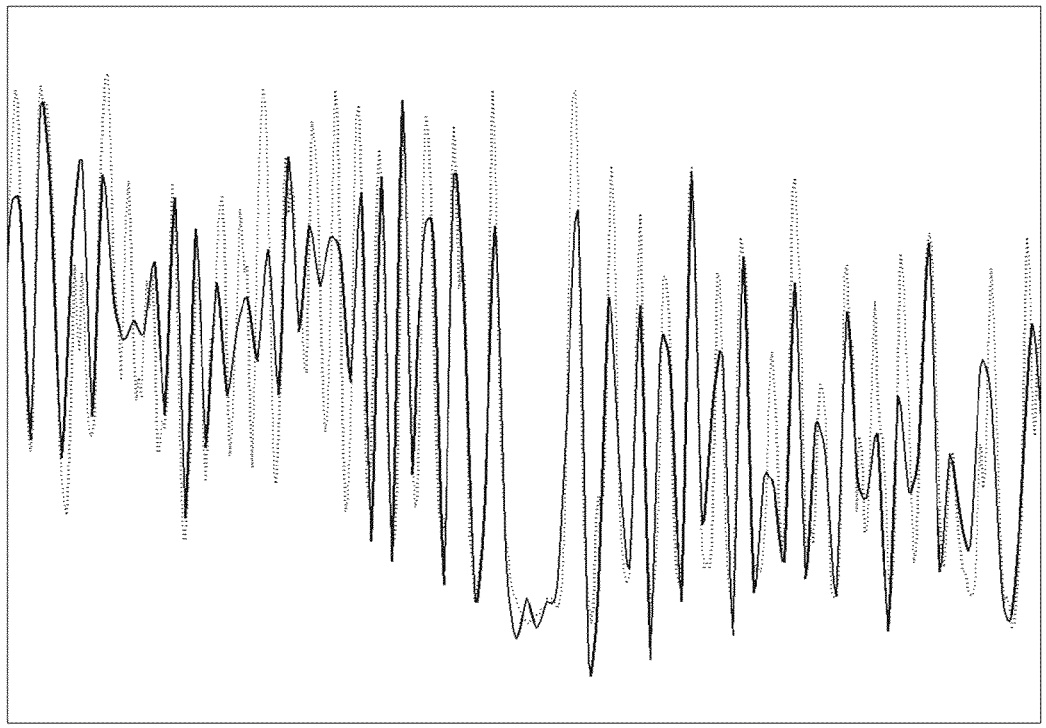
FIG. 18 displays a fragment from column #300 in the fingerprint image before (dotted line) and after application (solid line) of (a) W9/7 and (b) HButt/10/24, both with added SPIHT encoding/decoding with ⅛ bit per pixel compression rate.
Figure 18:
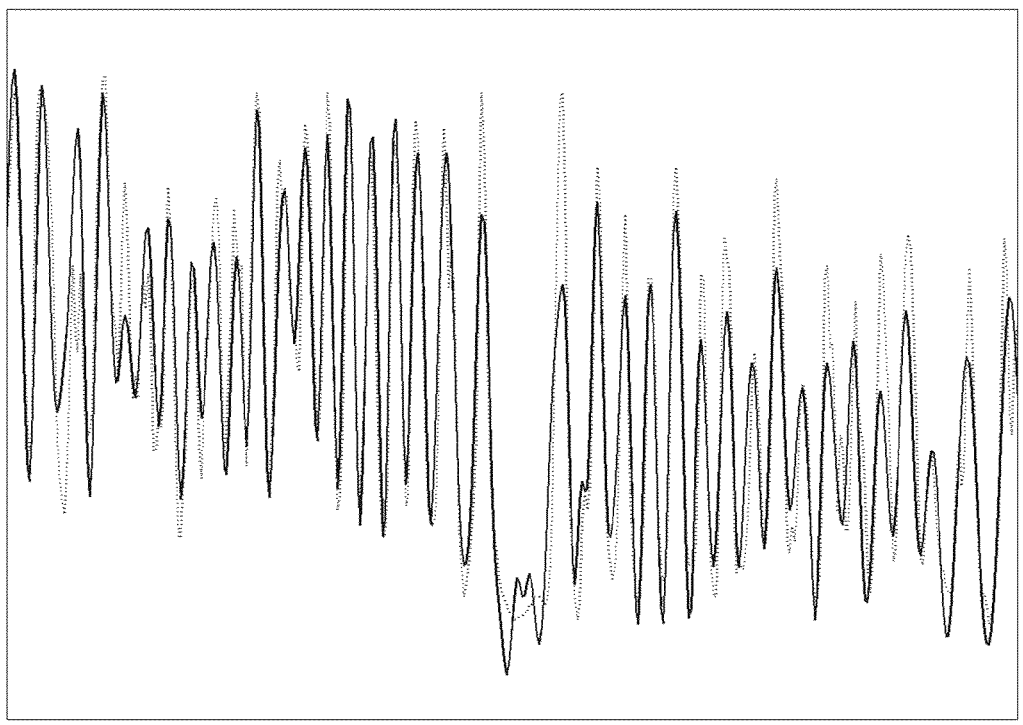

FIG. 18 displays a fragment of column #300 from the original section FIG. 16 (b) vs. a fragment from the reconstructed section after the application of (a) W9/7 and (b) HButt/10/24 followed by SPIHT encoding/decoding with 1/8 bpp compression rate. The match between solid and dotted lines in (b) is much better than in (a) in FIG. 18. For the HCT case, FIG. 18(b), almost all the "events" in the original data (dotted line) are present also in the reconstructed signal after the application of the HCT (solid line). This is not the case for the 2D wavelet transform W9/7 in FIG. 18(a).

In conclusion, as in the case of the seismic and the HS data, the HCT algorithms significantly outperform the 2D wavelet transform algorithms in fingerprint data compression. Note however that the 2D lapped DCT algorithm is also efficient for high bitrate compression.

EXAMPLE 6

Compression of Multimedia Images

The HCT algorithm was tested on multimedia images in which each pixel had 8 bits and was found to be efficient. Its superior performance was more evident for images that have oscillating textures. The algorithm restored the texture even at a very low bitrate.

Figure 19:
FIG. 19 displays (a) the original whole "Barbara" image, and (b) a fragment of the image.
Figure 19:

FIGS. 19 (a) and (b) shows respectively a "Barbara" image of size 512×512 and a fragment of the image of size 300×300. This image includes areas with oscillating textures. We compared the performance of the 2D wavelet transforms and HCTs, which used an image partition into Q=16 horizontal rectangles each of height 32. The achieved PSNR values are presented in Table 8.

TABLE 8

| Bit/pixel | Compression Ratio | W9/7 | WButt/4 | WButt/10 | H9/7/16 | HButt/10/16 |
|---|---|---|---|---|---|---|
| 1/8 | 64 | 24.69 | 24.42 | 24.65 | 24.97 | 25.45 |
| 1/4 | 32 | 27.36 | 27.04 | 27.80 | 27.92 | 28.52 |
| 1/2 | 16 | 31.08 | 31.17 | 31.83 | 32.07 | 32.64 |
| 1 | 8 | 36.33 | 36.52 | 37.41 | 37.39 | 37.79 |

The highest PSNR values were produced by HButt/10/16.

Figure 20:
FIG. 20 displays the reconstructed "Barbara" image using (a) W9/7 and (b) HButt/10/16, both with added SPIHT encoding/decoding with ⅛ bit per pixel compression rate.
Figure 20:

FIGS. 20 (a) and (b) display respectively the whole Barbara image and its fragment, reconstructed after the application of W9/7. FIGS. 20 (a) and (b) display respectively the whole Barbara image and its fragment, reconstructed after the application of HButt/10/16. The coefficients were coded by SPIHT with 1/8 bit per pixel compression rate. The reconstruction from the HButt/10/16 transformed image retains much better the texture of the data than the W9/7 transformed image.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement the methods disclosed herein, and to the extent that a particular digital computer system is configured to implement the methods of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions ("code") implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present invention.

The invention claimed is:

1. A method for compression of two-dimensional (2D) imagery data comprising the steps of:
    a) applying a wavelet transform to the imagery data in a first direction to obtain first direction wavelet transform coefficients;
    b) applying a local cosine transform (LCT) to the imagery data in a second direction orthogonal to the first direction to obtain a plurality Q of blocks of second direction LCT coefficients; and
    c) processing the wavelet transform coefficients and the Q blocks of LCT coefficients to obtain a 2D compressed image.

2. The method of claim 1, wherein the step of processing includes:
    i. reordering the Q blocks of LCT coefficients to obtain reordered LCT coefficients.

3. The method of claim 2, wherein the step of processing further includes:
    ii. quantizing the wavelet transform coefficients and the reordered LCT coefficients to obtain quantized coefficients, and
    iii. entropy coding the quantized coefficients to obtain the 2D compressed image.

4. The method of claim 2, wherein the reordering the Q blocks of LCT coefficients includes:
    A. arranging the LCT coefficients in each block in a bit-wise partitioning according to a logarithmic scale, and
    B. rearranging the bit-wise partitioned coefficients between blocks to appear like wavelet transform coefficients.

5. The method of claim 3, wherein the quantizing and entropy coding are done using the SPIHT codec.

6. The method of claim 3, wherein the quantizing and entropy coding are done using the EZW codec.

7. The method of claim 2, wherein the imagery data is selected from the group consisting of seismic data, hyperspectral images, fingerprints and multimedia images.

8. A non-transitory computer readable medium having stored therein computer executable instructions for compression of two-dimensional (2D) imagery data comprising:
    a) applying a wavelet transform to the imagery data in a first direction to obtain first direction wavelet transform coefficients;
    b) applying a local cosine transform (LCT) to the imagery data in a second direction orthogonal to the first direction to obtain a plurality Q of blocks of second direction LCT coefficients; and
    c) processing the wavelet transform coefficients and the Q blocks of LCT coefficients to obtain a 2D compressed image.

9. A method for compression of two-dimensional (2D) imagery data comprising the steps of:
    a) applying a wavelet transform to the imagery data in a first direction to obtain first direction wavelet transform coefficients;
    b) applying a local cosine transform (LCT) to the imagery data in a second direction orthogonal to the first direction to obtain a plurality Q of blocks of second direction LCT coefficients;
    c) reordering the Q blocks of LCT coefficients to obtain reordered LCT coefficients; and
    d) processing the wavelet transform coefficients and the reordered LCT coefficients to obtain a compressed 2D image.

10. The method of claim 9, wherein the step of reordering the Q blocks of LCT coefficients to obtain reordered LCT coefficients includes:
    i. arranging the LCT coefficients in each block in a bit-wise partitioning according to a logarithmic scale, and
    ii. rearranging the bit-wise partitioned coefficients between blocks to appear like wavelet transform coefficients.

11. The method of claim 9, wherein the step of processing includes:
    i. quantizing the wavelet transform coefficients and the reordered LCT coefficients to obtain quantized coefficients, and
    ii. entropy coding the quantized coefficients to obtain the 2D compressed image.

12. The method of claim 9, wherein the quantizing and entropy coding are done using the SPIHT codec.

13. The method of claim 9, wherein the quantizing and entropy coding are done using the EZW codec.

14. The method of claim 9, wherein the imagery data is selected from the group consisting of seismic data, hyperspectral images, fingerprints and multimedia images.

15. A non-transitory computer readable medium having stored therein computer executable instructions for compression of two-dimensional (2D) imagery data comprising:
    a) applying a wavelet transform to the imagery data in a first direction to obtain first direction wavelet transform coefficients;
    b) applying a local cosine transform (LCT) to the imagery data in a second direction orthogonal to the first direction to obtain a plurality Q of blocks of second direction LCT coefficients;
    c) reordering the Q blocks of LCT coefficients to obtain reordered LCT coefficients; and
    d) processing the wavelet transform coefficients and the reordered LCT coefficients to obtain a compressed 2D image.

16. A method for compression of two-dimensional (2D) imagery data comprising the steps of:
    a) applying a first local cosine transform (LCT) to the imagery data in a first direction to obtain a plurality Q of blocks of first direction LCT coefficients;
    b) applying a second LCT to the imagery data in a second direction orthogonal to the first direction to obtain a plurality R of blocks of second direction LCT coefficients; and c) processing the first direction Q blocks of LCT coefficients and the second direction R blocks of LCT coefficients to obtain a 2D compressed image wherein the first LCT and the second LCT are different.

17. A method for compression of two-dimensional (2D) imagery data comprising the steps of:
   a) applying a first local cosine transform (LCT) to the imagery data in a first direction to obtain a plurality Q of blocks of first direction LCT coefficients;
   b) applying a second LCT to the imagery data in a second direction orthogonal to the first direction to obtain a plurality R of blocks of second direction LCT coefficients wherein the first LCT and the second LCT are identical; and
   c) processing the first direction Q blocks of LCT coefficients and the second direction R blocks of LCT coefficients to obtain a 2D compressed image and wherein the step of processing includes:
      i. reordering the first direction Q blocks of LCT coefficients and the second direction R blocks of LCT coefficients to obtain reordered LCT coefficients, wherein the reordering the first direction Q blocks of LCT coefficients and the second direction R blocks of LCT coefficients includes arranging the LCT coefficients in each block in a bit-wise partitioning according to a logarithmic scale, and rearranging the bit-wise partitioned coefficients between blocks to appear like wavelet transform coefficients,
      ii. quantizing the reordered LCT coefficients to obtain quantized coefficients, and
      iii. entropy coding the quantized coefficients to obtain the 2D compressed image.

* * * * *